(12) United States Patent
Chen et al.

(10) Patent No.: US 12,471,057 B2
(45) Date of Patent: Nov. 11, 2025

(54) PAGING REMOTE UE USING A RELAY

(71) Applicant: INTERDIGITAL PATENT HOLDINGS, INC., Wilmington, DE (US)

(72) Inventors: Zhuo Chen, Claymont, DE (US); Pascal Adjakple, Great Neck, NY (US); Joseph Murray, Schwenksville, PA (US); Rocco Di Girolamo, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 615 days.

(21) Appl. No.: 17/785,465

(22) PCT Filed: Dec. 18, 2020

(86) PCT No.: PCT/US2020/066081
§ 371 (c)(1),
(2) Date: Jun. 15, 2022

(87) PCT Pub. No.: WO2021/127485
PCT Pub. Date: Jun. 24, 2021

(65) Prior Publication Data
US 2023/0026316 A1    Jan. 26, 2023

Related U.S. Application Data

(60) Provisional application No. 62/950,256, filed on Dec. 19, 2019.

(51) Int. Cl.
*H04W 68/00* (2009.01)
*H04W 76/14* (2018.01)
*H04W 88/04* (2009.01)

(52) U.S. Cl.
CPC ........... *H04W 68/00* (2013.01); *H04W 76/14* (2018.02); *H04W 88/04* (2013.01)

(58) Field of Classification Search
CPC ...... H04W 68/00; H04W 76/14; H04W 88/04
See application file for complete search history.

(56) References Cited

U.S. PATENT DOCUMENTS

| 10,674,425 B2* | 6/2020 | Gulati ................ H04W 72/542 |
| 2009/0232034 A1 | 9/2009 | Laroia et al. |
| 2013/0176890 A1 | 7/2013 | Sharma et al. |

(Continued)

FOREIGN PATENT DOCUMENTS

| CN | 104717714 A * | 6/2015 | ............ H04W 40/02 |
| CN | 106162676 A | 11/2016 | |

(Continued)

OTHER PUBLICATIONS

3rd Generation Partnership Project, "Technical Specification Group Services and System Aspects; System Architecture for the 5G System: Stage 2 (Release 15)", 3GPP TS 23.501 V15.6.0, Jun. 2019, 243 pages.

(Continued)

*Primary Examiner* — Qun Shen
(74) *Attorney, Agent, or Firm* — Flaster Greenberg P.C.

(57) ABSTRACT

Methods, systems, and devices may address issues for sending a paging message to a remote UE that is more than one hop from a base station.

10 Claims, 25 Drawing Sheets

(56) References Cited

U.S. PATENT DOCUMENTS

| | | | |
|---|---|---|---|
| 2016/0100353 A1* | 4/2016 | Gleixner | H04M 15/81 370/329 |
| 2016/0295494 A1* | 10/2016 | Gulati | H04W 72/542 |
| 2017/0317740 A1 | 11/2017 | Mallick et al. | |
| 2018/0076878 A1* | 3/2018 | Ryu | H04W 64/006 |
| 2018/0146507 A1 | 5/2018 | Tsuda et al. | |
| 2018/0287689 A1* | 10/2018 | Lee | H04W 48/16 |
| 2018/0338276 A1 | 11/2018 | Kaur et al. | |
| 2019/0387498 A1 | 12/2019 | Zhang et al. | |
| 2020/0015192 A1* | 1/2020 | Chun | H04W 76/27 |
| 2020/0100308 A1* | 3/2020 | Lee | H04W 76/25 |
| 2020/0245407 A1* | 7/2020 | Shan | H04W 68/02 |
| 2021/0153063 A1* | 5/2021 | Zhang | H04W 88/04 |
| 2023/0292391 A1* | 9/2023 | Mochizuki | H04W 76/27 |

FOREIGN PATENT DOCUMENTS

| | | | |
|---|---|---|---|
| CN | 107113916 A | 8/2017 | |
| CN | 107211297 A | 9/2017 | |
| CN | 107431915 A | 12/2017 | |
| CN | 108207017 A | 6/2018 | |
| CN | 108541395 A | 9/2018 | |
| CN | 110402599 A | 11/2019 | |
| EP | 3282786 A1 | 2/2018 | |
| EP | 3593565 A1 | 1/2020 | |
| WO | WO-2016163206 A1 * | 10/2016 | H04W 68/005 |
| WO | 2018/082869 A1 | 5/2018 | |
| WO | 2018/164821 A1 | 9/2018 | |
| WO | WO 2018/169343 A1 | 9/2018 | |

OTHER PUBLICATIONS

3rd Generation Partnership Project, "Technical Specification Group Radio Access Network; NR; Physical layer procedures for control (Release 15)", 3GPP TS 38.213 V15.7.0, Sep. 2019, 108 pages.

3rd Generation Partnership Project, "Technical Specification Group Radio Access Network; NR; Radio Resource Control (RRC) protocol specification (Release 15)", 3GPP TS 38.331 V15.7.0, Sep. 2019, 527 pages.

* cited by examiner

PAGING REMOTE UE USING A RELAY

CROSS-REFERENCE TO RELATED APPLICATIONS

This application is the National Stage Application of International Patent Application No. PCT/US2020/066081, filed Dec. 18, 2020, which claims the benefit of U.S. Provisional Patent Application No. 62/950,256, filed on Dec. 19, 2019, entitled "Methods and Apparatus For Paging Remote UE," the contents of which are hereby incorporated by reference herein.

BACKGROUND

Discontinuous Reception for Paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent 3GPP TS 38.213, Physical layer procedures for control (Release 15), V15.7.0 ([1]). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor}(UE\_ID/N) \bmod Ns$$

The PDCCH monitoring occasions for paging are determined according to pagingSearchSpace as specified in [1] and firstPDCCH-MonitoringOccasionOfPO if configured as specified in [1]. When SearchSpaceId=0 is configured for pagingSearchSpace, the PDCCH monitoring occasions for paging are same as for RMSI as defined in clause 13 in [1].

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S' consecutive PDCCH monitoring occasions where 'S' is the number of actual transmitted SSBs determined according to ssb-PositionsInBurst in SIB1. The $K^{th}$ PDCCH monitoring occasion for paging in the PO corresponds to the $K^{th}$ transmitted SSB. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and upper layers, and a default DRX value broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in 3GPP TS 38.331, Radio Resource Control (RRC) protocol specification (Release 15), V15.7.0 ([2]). The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48-bit long bit string as defined in 3GPP TS 23.501, System Architecture for the 5G System; Stage 2 (Release 15), V15.6.0 ([3]). 5G-S-TMSI shall in the formulae above be interpreted as a binary number where the left most bit represents the most significant bit.

Layer 2 Evolved UE-to-Network Relay Solution Architecture

For protocol architecture for the user plane and control plane, relaying is performed above RLC sublayer. The evolved ProSe Remote UE's user plane and control plane data are relayed above RLC via the evolved ProSe UE-to-Network Relay UE from the evolved ProSe Remote UE to network and vice versa. Uu PDCP and RRC are terminated between the evolved ProSe Remote UE and the eNB while RLC, MAC and PHY and the non-3GPP transport layers are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 1 and FIG. 2.

Paging for Evolved ProSe Remote UE

It is assumed that the evolved ProSe Remote UE should be linked with the evolved ProSe UE-to-Network Relay UE in order to receive paging via the evolved ProSe UE-to-Network Relay UE. The evolved ProSe Remote UE supports reception of paging over the linked evolved ProSe UE-to-Network Relay UE while the evolved ProSe Remote UE is in and out of E-UTRAN coverage. The evolved ProSe UE-to-Network Relay UE supports forwarding of paging for the evolved ProSe Remote UE located in and out of E-UTRAN coverage. There are multiple possible paging options with which the evolved ProSe Remote UE in RRC_IDLE can be reachable in downlink when it is in E-UTRAN coverage or out of E-UTRAN coverage as shown below.

Option 1: The evolved ProSe UE-to-Network Relay UE monitors its linked evolved ProSe Remote UE's PO in addition to its own PO. The evolved ProSe Remote UE does not need to attempt paging reception over downlink while linked to the evolved ProSe UE-to-Network Relay UE. The evolved ProSe UE-to-Network Relay UE may need to monitor multiple paging occasions. The evolved ProSe UE-to-Network Relay UE has to know the paging occasion of the evolved ProSe Remote UE and has to decode a paging message and determine which evolved ProSe Remote UE the paging is for. Also, the evolved ProSe UE-to-Network Relay UE may need to relay the evolved ProSe Remote UE's paging over short range link. This option is shown in FIG. 3.

Option 2: The evolved ProSe UE-to-Network Relay UE monitors its own PO only and paging for the linked evolved ProSe Remote UE is also sent in the evolved ProSe UE-to-Network Relay UE's PO. The evolved ProSe Remote UE does not need to attempt paging reception over downlink while linked to the evolved ProSe UE-to-Network Relay UE. The evolved ProSe UE-to-Network Relay UE has to decode a paging message, determine which evolved ProSe Remote UE the paging is for and needs to relay the evolved ProSe Remote UE's paging over short range link. In order to page the evolved ProSe Remote UE, the core network (i.e. MME) is required to know linked status between the evolved ProSe UE-to-Network Relay UE and the evolved ProSe Remote UE and remap evolved ProSe Remote UE's paging messages to occur on evolved ProSe UE-to-Network Relay UE's POs when evolved ProSe Remote UE are linked. This option is shown in FIG. 4.

This background information is provided to reveal information believed by the applicant to be of possible relevance. No admission is necessarily intended, nor should be construed, that any of the preceding information constitutes prior art.

SUMMARY

Disclosed herein is subject matter that may address issues for sending a paging message to a remote UE that is more than one hop from a base station. Specifically, the following subject matter is disclosed.

Relay UE election methods are disclosed for enabling or disabling the relay function of a relay capable UE to act as a UE-to-NW relay or UE-to-UE relay for paging message.

Paging path establishment methods are disclosed for establishing a path between a remote UE and a gNB before the gNB sends out a paging message to the remote UE. A paging path discovery procedure is disclosed for a gNB to discover multiple candidate paging paths between the remote UE and the gNB. Paging path configuration procedures are disclosed for a gNB to select and configure the adaptation layer of the UE-to-NW Relay and zero or more UE-to-UE Relays that forward the paging along the paging path. Also disclosed is a selection-based paging path establishment method that the remote UE establishes its paging path along the paging path of the relay UE by configuring the adaptation layer of UE-to-UE relays and the UE-to-NW relay on the paging path.

Paging propagation methods are disclosed for propagating a paging message from a gNB to a remote UE via an established paging path. In a first disclosed method, the UE-to-NW Relay UE monitors the remote UE's PO in addition to its own PO. In a second disclosed method, the UE-to-NW relay monitors its own PO only and paging for the remote UE is also sent in the UE-to-Network Relay UE's PO.

Paging path maintenance methods are disclosed for the remote UE, UE-to-UE relays, or UE-to-NW relays in the network dynamically maintaining the paging path between the remote UE and gNB when the topology changes. In a first disclosed method, a remote UE may select a new relay UE and establish a new paging path to the gNB. In a second disclosed method, one or more relay UEs on the paging path of the remote UE may select a new relay UE and establish a new paging path to the gNB.

UE reachability management methods are disclosed for a remote UE to maintain the paging path by periodically sending path update messages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
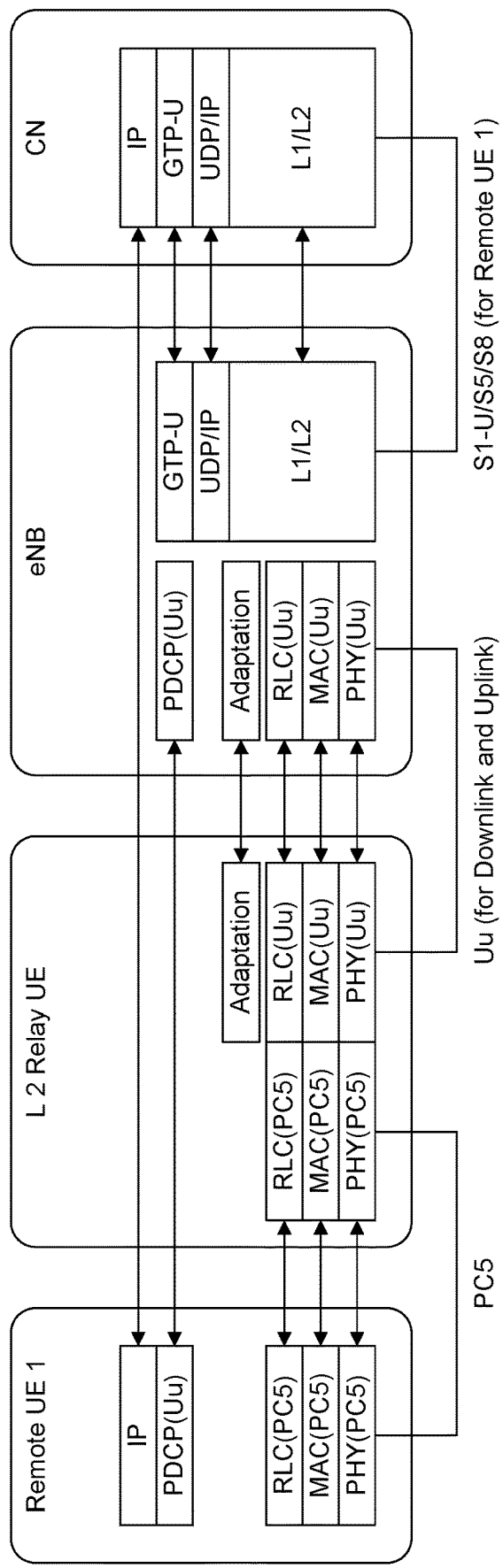
FIG. 1 illustrates an exemplary User plane radio protocol stack for layer 2 evolved UE-to-Network relay (PC5)
Figure 2:
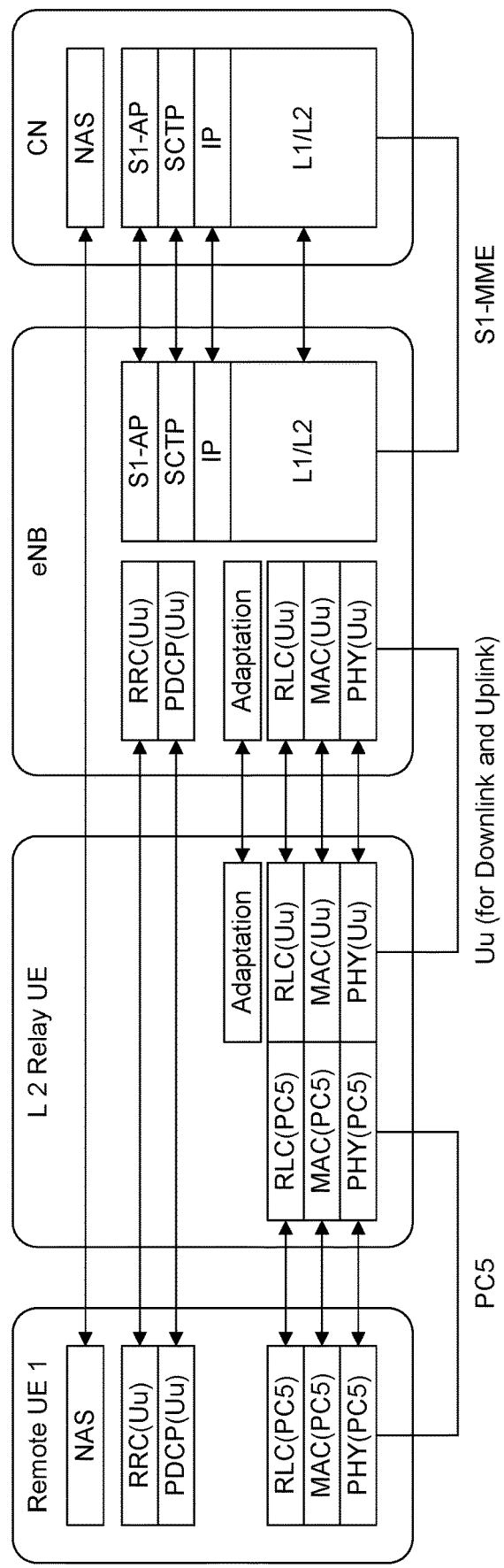
FIG. 2 illustrates an exemplary Control plane radio protocol stack for layer 2 evolved UE-to-Network relay (PC5)

In LTE and NR, the granularity for location context of a UE is at "Tracking Area" when a UE is in RRC_Idle and is at "RAN Notification Area" when a UE is in RRC_Inactive. To send a paging to a UE, a gNB within the TA and RNA broadcasts paging to all UEs within the area. However, in the scenario that there are multiple relays in an area, broadcast paging by relay UEs will cause paging message flooding in the area which introduces significant overhead. Therefore, there is a need to establish one or more paging paths to propagate a paging message from gNB to a remote UE. The first set of issues need to be addressed is how one or more paging paths are established between a gNB and a remote UE.

Issue 1—Relay UE (s) election for relaying of paging: In the network, some UEs support a relay function to relay paging message and some do not, for example due to their hardware and software capability. However, for UEs that support the relay function, the relay function may not be enabled or elected to relay paging message as a result of UE conditions or network conditions. How does the relay function of a relay capable UE become enabled to act as a relay for paging message?

Issue 2—Remote UE selection of a Relay UE for paging reception: If a remote UE needs to select a (new)Relay UE for paging reception, how does a remote UE select a relay UE for paging reception?

Issue 3—Determination by the relay UE of which remote UE(s) to forward paging to: How does the relay UE know about which remote UE to relay paging to? Is this knowledge implicit or explicit?

Issue 4—Knowledge of Remote UE POs at the relay UE: How does the relay UE know the POs of the remote UEs paging are being relayed to?

The remote UE may be moving. The mobility of remote UE introduces another set of issues.

Issue 5—Traditional RAN area update procedure, registration area update procedure, or UE periodic registration area update are limited to one hop. The UE needs to switch to RRC connected mode to send a RANU or Registration area update. How a remote UE maintains UE reachability status in the NW (CN or RAN) through other relay UEs should be addressed.

Issue 6—How can the paging relay path be quickly reestablished so that the remote UE can seamlessly receive paging from the NW.

Disclosed herein is subject matter that may address issues for sending a paging message to a remote UE that is more than one hop from a base station. The disclosed subject matter includes a remote UE that establishes one or multiple paths to receive a paging message from a gNB or a relay UE that forwards a paging message from gNB to a remote UE.

Methods, systems, and apparatuses, among other things, as described herein may provide for paging a remote UE. A method, system, computer readable storage medium, or apparatus provides for receiving relay context information from one or multiple neighbor UEs; based on obtained relay context information, initiating a discovery-based paging path establishment procedure to discover and establish one or multiple paging paths between the remote UE and the gNB by sending paging path discovery request to one or multiple neighbor relay UEs to discovery one or multiple paths to the gNB and receiving paging path discovery response from neighbor UEs or gNB to confirm the establishment of a paging path; based on obtained relay context information, indicating a selection-based paging path establishment procedure that the remote UE establishes its paging path along the paging path of the remote UE's neighbor relay UE by sending a paging path establishment request to select and configure the remote UE's neighbor UEs that has established one or more paging path to a gNB and receiving a paging path establishment response to confirm the establishment of a paging path; selecting a new relay UE and establish a new paging path to the gNB; and maintaining the paging path and update the reachability of the network by sending path update towards the gNB A method, system, computer readable storage medium, or apparatus provides for enabling relay function or disabling relay function based on trigger conditions or configured by a gNB; and enabling transmitting relay context information or disabling transmitting relay context information based on triggers conditions (e.g., status, context information, among other information) or configurated by gNB. In the discovery-based paging path establishment procedure: receiving a paging path discovery request message; determining whether to serve as a paging relay for the remote UE and forward this paging message to the gNB based on one or more criteria; inserting relay UE's UE ID appended in paging path discovery request message and forwarding towards to a gNB; receiving a path discovery response message to configure relay UE's adaptation layer to forward paging from a gNB to a remote UE; and receiving a paging path configuration message to configure relay UE's adaptation layer to forward paging from a gNB to a remote UE. In the selection-based paging path establishment procedure a paging path establishment request may be received to configure relay UE's adaptation layer to forward paging from a gNB to a remote UE. A method, system, computer readable storage medium, or apparatus provides for receiving a paging message from gNB; extracting remote UE information in the paging message; and forwarding the paging message to the next UEs on the paging path. A method, system, computer readable storage medium, or apparatus provides for receiving a paging message from a UE and forwarding the paging message to the next UEs on the paging path toward the remote UE. A method, system, computer readable storage medium, or apparatus provides for selecting a new relay UE and establishing a new paging path to the gNB, which may include re-establishing paging path for all UEs that the relay UE forwards paging messages to and updating new paging path information to the UEs that relay UE's forwards paging message to. Trigger conditions may include a threshold capacity of a UE, a threshold status of a UE, or a threshold number of relay UEs in a defined geographic area. All combinations in this paragraph and the previous paragraph (including the removal or addition of steps) are contemplated.

Architecture and Protocol Stack

Figure 5:
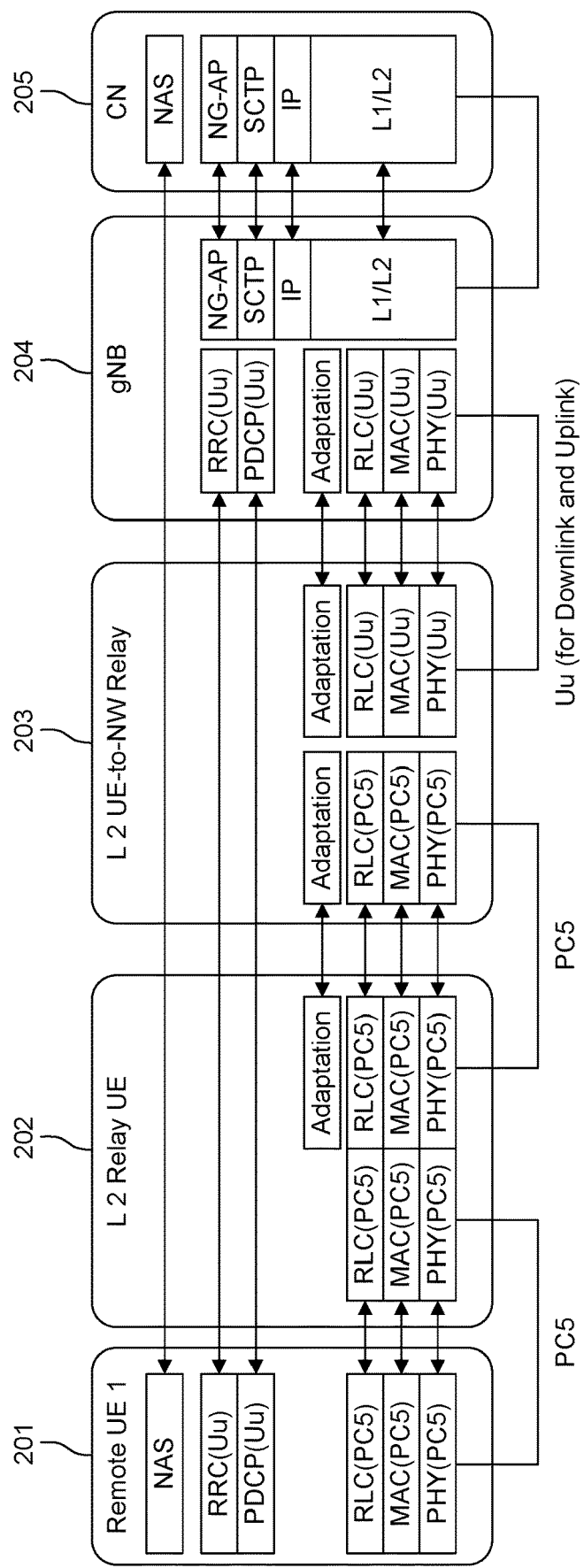
FIG. 5 illustrates an exemplary Control plane radio protocol stack for layer 2 UE-to-Network relay (PC5) and UE-to-UE relay (PC5)
Figure 6:
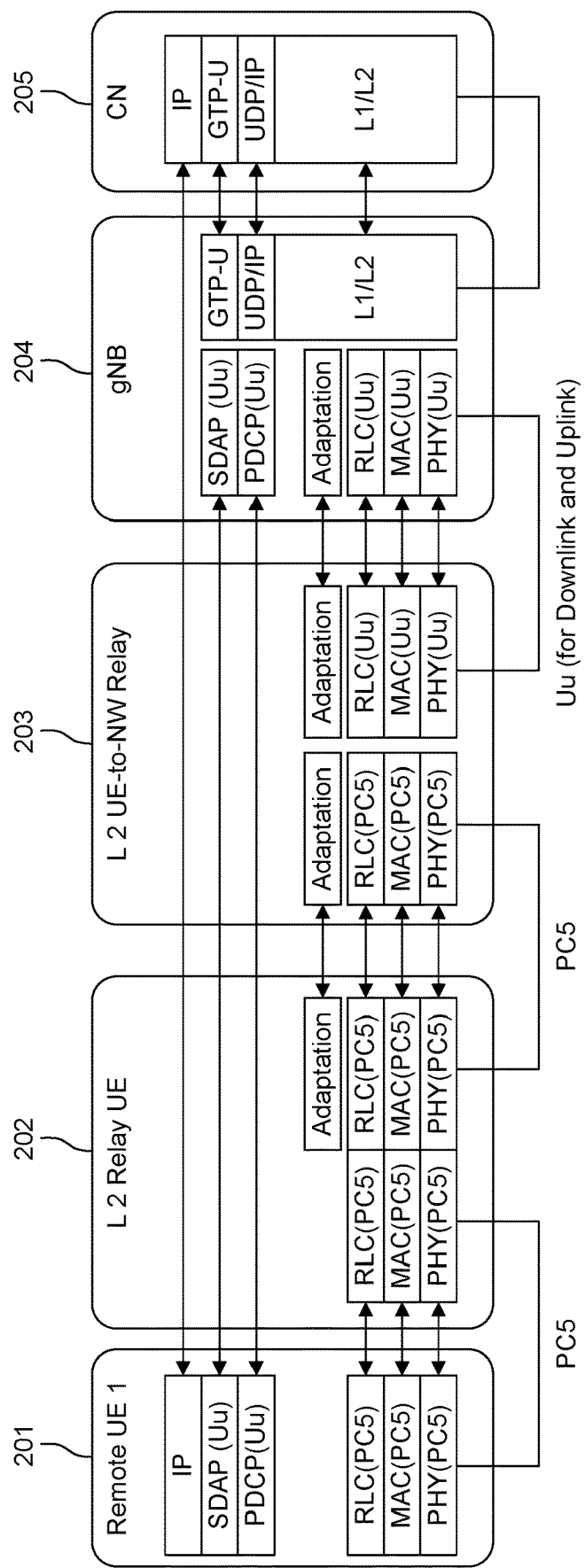
FIG. 6 illustrates an exemplary User plane radio protocol stack for layer 2 UE-to-Network relay (PC5) and UE-to-UE relay (PC5)

The control plane protocol stack and the user plane protocol stack when PC5 is used between the remote UE, the UE-to-UE Relay UEs, and the UE-to-Network Relay UE to relay traffic is shown in FIG. 5 and FIG. 6. For protocol architecture for the user plane and control plane, relaying is performed above RLC sublayer. The user plane of remote UE 201 and control plane data are relayed above RLC via UE-to-UE Relay UE 202 or UE-to-Network Relay UE 203 from remote UE 201 to network and vice versa. Uu PDCP and RRC are terminated between remote UE 201 and gNB 204 while RLC, MAC and PHY are terminated in each link (e.g., the link between remote UE 201 and UE-to-UE Relay UE 201, the link between UE-to-UE Relay UE 201 and Network Relay UE 203, and the link between the UE-to-Network Relay UE 203 and gNB 204). In the following (e.g., FIG. 5 or FIG. 6), the RLC layer is shown terminating on each hop. However, the RLC layer from remote UE 201 may also terminate at gNB 204.

A paging message may by sent by gNB 204 and forwarded by UE-to-NW relay 203 and zero or more UE-to-UE relays 202 to remote UE 201 along one or multiple paths. In this disclosure, these paths are named as paging paths. First, relay UE election methods are disclosed for enabling or disabling the relay function of a relay capable UE to act as a UE-to-NW relay 203 or UE-to-UE relay 202 for paging message as associated with Relay UE election. A paging path can be established between remote UE 201 and gNB 204 before gNB 204 sends out a paging message to remote UE 201 as associated with Paging path established. Methods are disclosed about how a paging message may be propagated from gNB 204 to remote UE 201 via an established paging path as associated with Paging propagation. Due to the topology changes caused by mobility and relay UE election change, remote UE 201, UE-to-UE relays 202, or UE-to-NW relays 203 in the network need to dynamically maintain the paging path between remote UE 201 and gNB 204 as associated with Paging Path Maintenance and Reachability Management.

Relay UE Election

In the network, some UEs support relay function to relay paging message and some do not due to their hardware and software capability. However, for UEs that support relay function, the relay function may not be enabled or not be elected to relay paging message. A UE becomes a relay UE when its relay function is enabled. To address issue 1 in in the problem statement, relay UE election methods are disclosed for enabling or disabling the relay function of a relay capable UE to act as a UE-to-NW relay 203 or UE-to-UE relay 202 for paging message.

A UE can enable and disable its relay function itself based on its status (e.g., capacity). For example, if the battery power of the UE is below a pre-configured threshold, the UE can disable its relay function. If a UE has a Uu interface with gNB 204, the UE can enable its relay function and self-elects as a UE-to-NW relay UE 203. If a UE does have a Uu interface with gNB 204, the UE can enable its relay function and self-elects as a UE-to-UE relay 202. If a relay UE is willing to serve as a relay UE for new neighbor UEs, it may periodically broadcast its relay context information as listed in Table 1 to its neighbors. Otherwise, based on its status, a relay UE can stop broadcasting its relay context information to its neighbors. For example, if the number of UEs that select the relay UE as relay is larger than a pre-configured threshold, the UE can stop broadcast its relay context information to its neighbors. When a UE receives a relay context information from a neighbor relay UE, it should know the neighbor relay UE is willing to serve as a relay UE. Note that when the relay function on a UE is disabled, the UE may send a stop relaying request to each UE that selects it as a relay UE, to its neighbor UEs that select the UE as a relay UE, or to all neighbor of the UE that the UE stops serving as relay UE. A relay UE may not send its relay context information until it receives a request from its neighbor UE.

A UE can enable and disable its relay function based on number of relay UE in its vicinity. For example, a UE can enable its relay function if there is no relay UE that broadcasts relay context information in its vicinity. A UE can disable its relay function if it receives relay context information from its neighbors. A relay UE may enable or disable broadcasting its relay context information based on number of relay UEs in its vicinity. For example, a UE can enable broadcasting if there is no relay UE that broadcasts relay context information in its vicinity. A UE can disable broadcasting if it receives relay context information from its neighbors.

Figure 7:
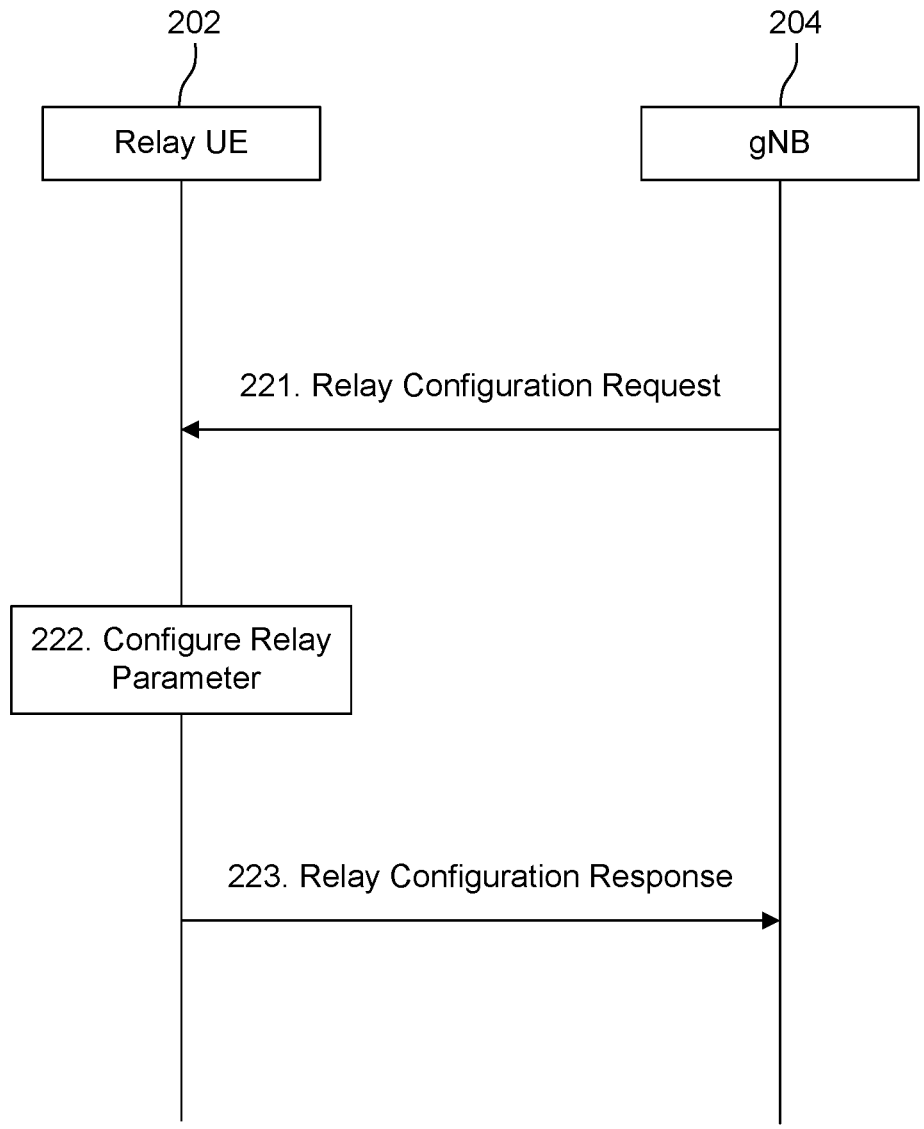
FIG. 7 illustrates an exemplary Relay UE election and configuration by gNB.

A UE can enable and disable its relay function configured by gNB 204 as shown in FIG. 7. FIG. 7 illustrates an exemplary Relay UE election and configuration by gNB. At step 221, relay UE 202 may receive a relay configuration request from gNB 204. At step 222, based on the information (e.g., context information) of the relay configuration request of step 221, configuring a relay parameter. At step 223, sending a relay configuration response to gNB 204. gNB 204 can send a relay configuration request to enable or disable the relay function, enable or disable the relay UE broadcasting its relay context information, based on criteria, such as the UE's location, beam direction, capability, traffic load or based on network requirement and policies via a dedicated message. gNB 204 can send criteria for a UE to enable or disable the relay function, enable or disable the relay UE broadcasting its relay context information, that the UE may use to determine whether to disable or enable. The relay UE may confirm or refuse the relay configuration request in the request.

Paging Path Established

A paging may be sent by gNB 204 and forwarded by the UE-to-NW relay 203 and zero or more UE-to-UE relays 202 to remote UE 201. A paging path can be established between remote UE 201 and gNB 204 before gNB 204 sends out a paging message to remote UE 201. To address issue 2, issue 3, or issue 4 in the problem statement, methods are disclosed for establishing one or multiple paging paths between gNB 204 or remote UE 201. In the first disclosed method described (e.g., Discovery based Paging Path Establishment), a paging path discovery procedure may be triggered by remote UE 201 for gNB 204 to discover multiple candidate paging paths between remote UE 201 and gNB 204. gNB 204 may then select and configure the adaptation layer of the UE-to-NW Relay 203 and zero or more UE-to-UE relays 202 that forward the paging along the paging path.

In another disclosed method associated with Paging Path Establishment over Existing Paging Path, remote UE 201 may select one of relay UEs that has established one or multiple paging paths to gNB 204, and may then establish its paging path following the paging path of the relay UE by configuring the adaptation layer of relay UEs on the paging path.

Discovery Based Paging Path Establishment

In the discovery-based paging path establishment method, a paging path discovery procedure may be triggered by remote UE 201 for gNB 204 to discover multiple candidate paging paths between remote UE 201 and gNB 204 as associated with paging path discovery procedure. Then gNB 204 may select one or more paging paths and establish the paging path via configuring relay UEs on the path as associated with the paging path configuration procedure.

1. Paging Path Discovery Procedure

Figure 8:
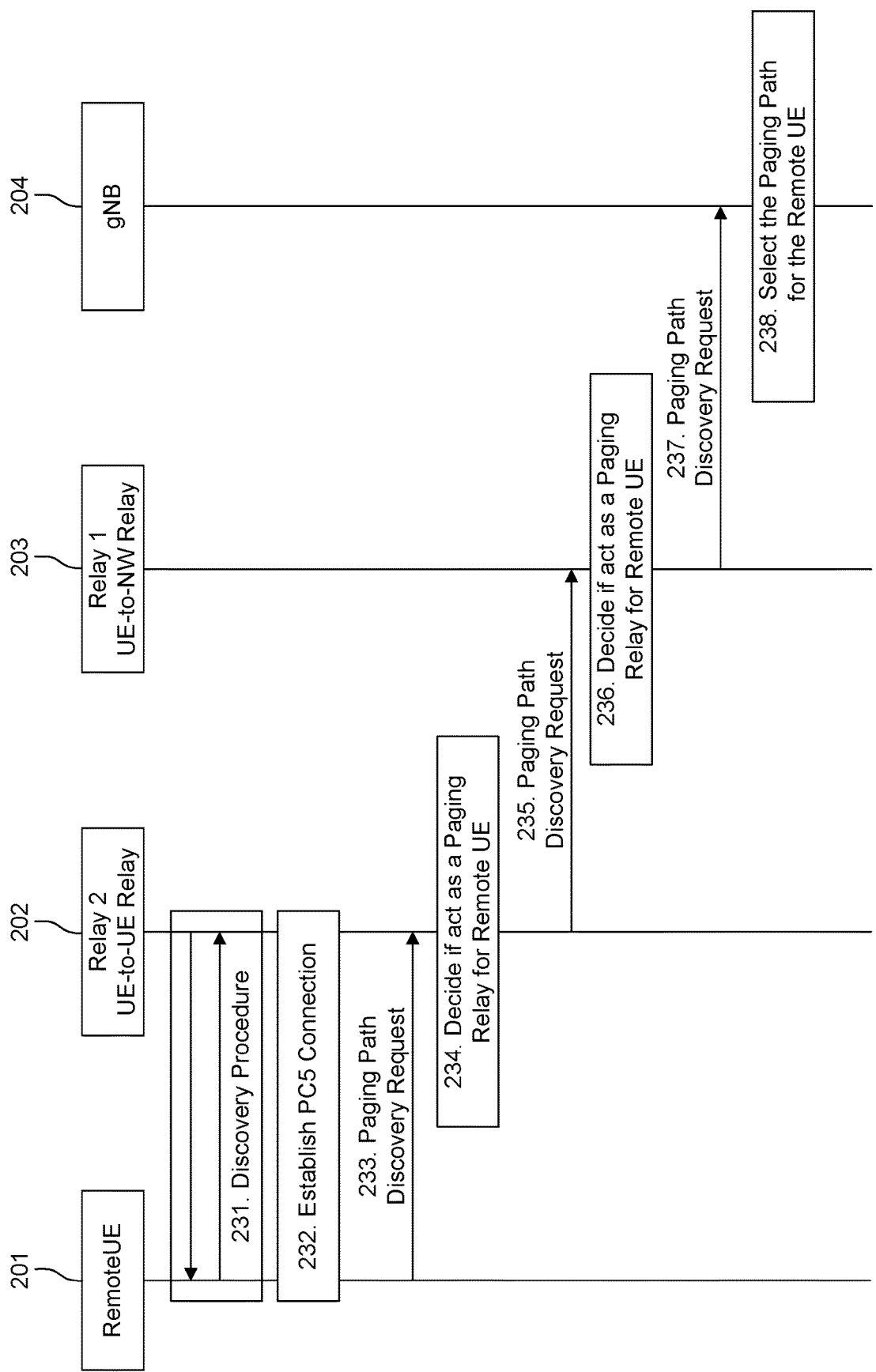
FIG. 8 illustrates an exemplary Paging Path discovery procedure.

A paging path discovery procedure is disclosed for gNB 204 to discover multiple candidate paging paths between remote UE 201 and gNB 204 as shown in FIG. 8. remote UE 201 triggers the procedure by sending (e.g., at step 233) a paging path discovery request to gNB 204. The paging path discovery request is forward by one or multiple relay UEs to gNB 204 (e.g., step 234-step 237). Thus, gNB 204 can discover multiple candidate paging paths between remote UE 201 and gNB 204. gNB 204 may select one or multiple paging paths at the end of the procedure based on several criteria (e.g., step 238).

At step 231, a discovery procedure may be executed between remote UE 231 and relay 202. Remote UE 201 and the relay UE 202 may discover each other via the discovery procedure. During the discovery procedure, relay UE 202 may broadcast or transmit its relay context information as shown in Table 1.

TABLE 1

| Name | Description |
| --- | --- |
| Relay context information | |
| UE ID | The identity of the Relay UE |
| Relay Type | The type of the Relay UE, e.g. UE-to-NW relay or UE-to-UE relay. |
| RRC State | The RRC State of the relay UE, e g. RRC_INACTIVE, RRC_IDLE, RRC_CONNECTED |
| Relay Capability | Whether the relay is capable of relaying the paging message to UE. For example, if the relay UE does not have relay path to the gNB, the relay UE does not have the capability to serve as a paging relay UE for other UEs. |
| gNB ID | The ID, e.g. NR Cell Global Identifier (NCGI), of the gNB the relay UE has connected to. |
| PLMN ID | The ID of the PLMN the relay UE has connected to. |
| RAN-AreaCode | Identity of the RAN area of the gNB that the relay UE connects with. |
| TrackingAreaCode | Identity of the tracking area of the gNB that the relay UE connects with. |
| UE-to-NW relay UE ID | Identification of the UE-to-NW Relay UE the relay UE has connected to. |
| Relay Tier | How many hops the relay UE is away from the gNB. For example, the relay tier is 1 for a UE-to-NW relay UE since UE-to-NW relay is only 1 hop away from gNB. In another example, the relay tier is 2 for relay UE 202 shown in FIG. 8 since the UE-to-UE relay is 2 hops away from gNB. |

At step 232, a PC5 connection may be established between remote UE 201 and relay 202. Remote UE 201 and the Relay UE 202 may establish a PC5 connection after the discovery. Remote UE 201 may further collect relay context information of relay UE 202, e.g., the link quality between relay UE 202, Sidelink (SL) DRX cycle of relay UE 202.

At step 233, relay 202 receives a paging path discovery request from remote UE 201. Remote UE 201 sends a paging path discovery request message to relay UEs discovered during step 231. Remote UE 201 may send the message using broadcast to all relay UEs within broadcast communication range or using unicast to each discovered relay UE 202. The paging path discovery request message may include but not limited to information shown in Table 2.

TABLE 2

| Fields name | Description |
| --- | --- |
| Paging path discovery request message | |
| ID of the remote UE | Identification of the UE that initiates the paging path discovery request message. UE identity may include the 5G-S-TMSI, the I-RNTI-Value and Access Stratum(AS) ID of the UE. |
| Sequence Number | The sequence number generated by the remote UE to differentiate the paging path discovery request it sends. For example, the sequence number is increased by one for each new paging path discovery request message generated. |
| gNB ID | The ID, e.g. NR Cell Global Identifier (NCGI), of the gNB the remote UE request to receiving paging. If the remote UE may not include this field in the message if it requests to receiving paging from any gNB. |
| Relay Tier | The tier information of the UE that transmits the message. For a remote UE that does not has relay tier information, the value of relay tier is set to the maximum allowed value. |
| IDs of Relay UEs traversed | The ID of each Relay UE the paging path discovery request message has traversed. Each Relay UE may append its ID in this field if it forwards the paging path discovery request message. The ID of Relay UE may be a AS layer ID or a network ID. |
| Parameter to calculate the paging occasion and DRX of the remote UE. | The following information may be included for calculate the paging occasion and DRX of the remote UE. T: DRX cycle of the remote UE UE_ID: 5G-S-TMSI mod 1024 |
| RRC State of the remote UE | The RRC State of the remote UE, e.g. RRC_INACTIVE, RRC_IDLE |

At step 234, relay 202 determines if it should act as a paging relay for remote UE 201. When relay UE 202 receives a paging path discovery request message, it checks whether to serve as a paging relay for the remote UE and forward this paging message to the gNB based on the criteria, such as described in the following examples. In an example, there may be forwarding if gNB ID in the message is the same as gNB 204 that the relay UE 202 communicates with or gNB ID field is not specified. In an example, there may be forwarding if gNB ID in the message is the same as gNB 204 that relay UE 202 communicates to or the gNB ID field is not specified. In an example, there may be forwarding if relay UE 202 has the capability to serve as a paging relay. In an example, there may be forwarding if relay tier in the message is larger than the tier of relay UE 202. The relay tier of a UE is number of hops the UE is away from the gNB. For example, the relay tier is 1 for a UE-to-NW relay UE since UE-to-NW relay is only 1 hop away from gNB. In another example, the relay tier is 2 for relay UE 202 shown in FIG. 8 since the UE-to-UE relay is 2 hops away from gNB. In an example, there may be forwarding if relay UE 202 has never received the message with the same sequence number originated from the same remote UE 201.

If the relay UE 202 forwards the message, relay UE 202 may insert its UE ID appended in paging path discovery request message. The ID of relay UE 202 may be a AS layer ID or a network ID.

At step 235, relay 202 may send a paging path discovery request to relay 203. Relay UE 202 forwards the paging path discovery request message towards gNB 204. Relay UE 202 may send the message using broadcast to relay UEs within the broadcast communication range. Alternatively, relay UE 202 may send the message using unicast to each relay UE it has a PC5 connection. Relay UE 202 may only send to another relay UE that connects with the same gNB 204 as indicated in the paging path discovery message, and the tier number of another UE is smaller than its own tier number.

At step 236, relay 203 determines whether to act as a paging relay for remote UE 201. Relay UE 203 checks whether to serve as a paging relay for remote UE 201 or forward this paging message to gNB 204 the same as step 234.

At step 237, relay 203 sends a paging path discovery request to gNB 204. Relay UE 203 forwards the paging path discovery request message to gNB 204 since it has a direct connection with gNB 204.

At step 238, gNB 204 selects the paging path for remote UE 201. The gNB 204 may receive multiple paging path discovery requests sent by the same remote UE 201 with the same sequence number, and gNB 204 may select one of the multiple paging paths for remote UE 204.

Paging Path Configuration Procedure

Paging path configuration procedures are disclosed for a gNB 204 to establish one or multiple paging paths between remote UE 201 and gNB 204. gNB 204 triggers the procedure after selecting one of multiple paging paths for remote UE 201.

Figure 9:
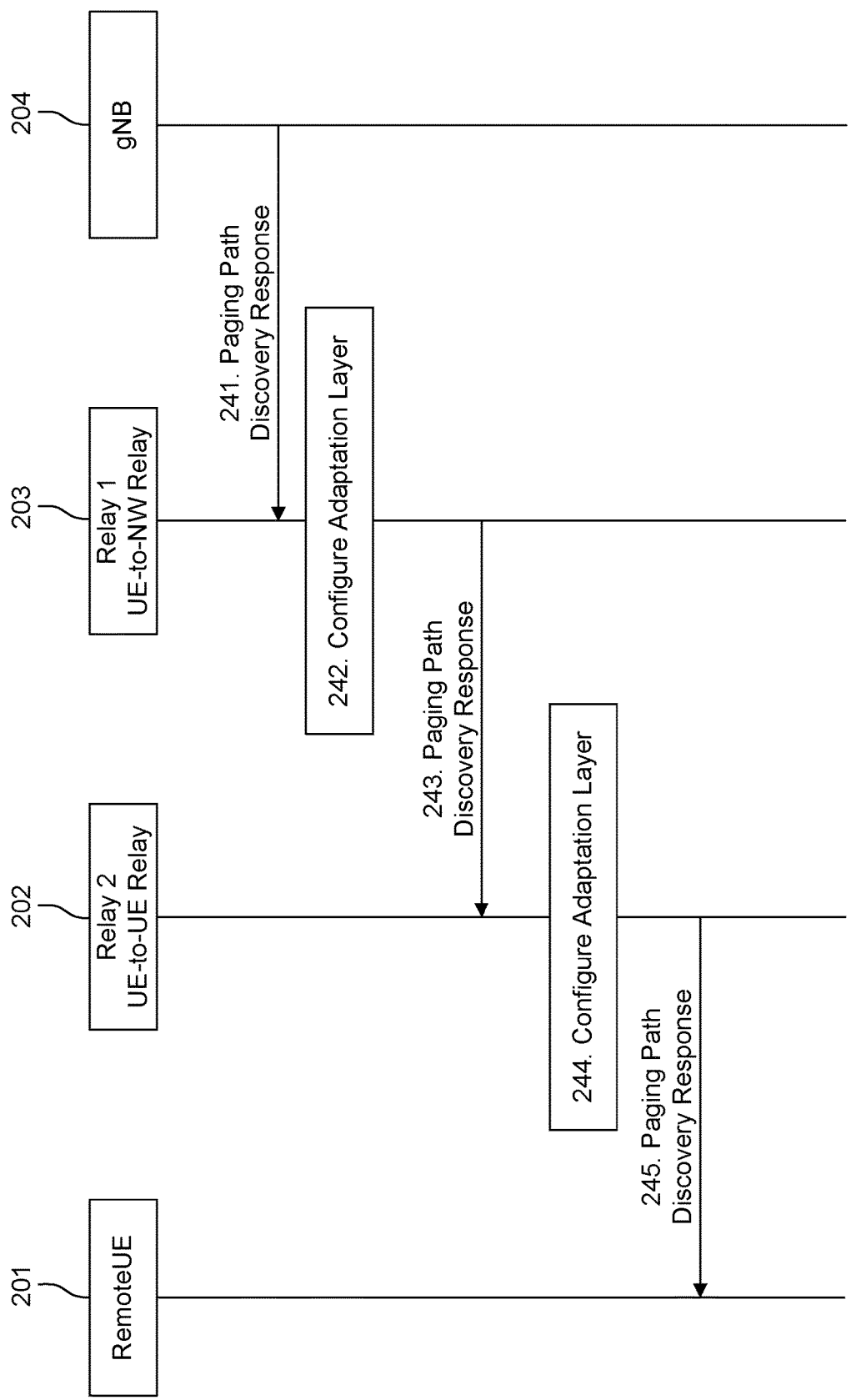
FIG. 9 illustrates an exemplary End to end paging path configuration.

In the first disclosed procedure as shown in FIG. 9, gNB 204 sends a paging path discovery response to remote UE 201. The discovery response may include the full paging path information and may be forwarded via all or some of relay UEs 202 on the path. When relay UE 202 receives a paging path discovery response, relay UE 202 may configure its adaptation layer in order to forward a paging message from gNB 204 to remote UE 201 in the future.

With continued reference to FIG. 9, at step 241, gNB 204 sends a paging path discovery response to UE-to-NW relay 203 on the paging path. The message may include but not limited to the information shown in Table 3.

TABLE 3

| Paging path discovery response message | |
|---|---|
| Fields name | Description |
| gNB ID | The ID, e.g. NR Cell Global Identifier (NCGI), of the gNB that sending the response. |
| Remote UE ID | Identification of the UE that initiates the paging path discovery request message. UE identity may include the NG-5G-S-TMSI, the I-RNTI-Value and AS ID of the UE. |
| RRC State of the remote UE | The RRC State of the remote UE, e g. RRC_INACTIVE, RRC_IDLE |
| UE-to-NW Relay UE ID | Identification of the UE-to-NW Relay UE that is on the paging path. The ID of Relay UE may be a AS layer ID or a network ID. |
| Sequence Number | The sequence number in the paging path discovery request. |
| Relay Tier | The tier information of the remote UE based on the selected paging path. |
| Paging path ID | The ID of the paging path assigned by the gNB. |
| Paging path update timer | Indicate the time interval the remote UE send a paging update when the timer expires. |

TABLE 3-continued

| Paging path discovery response message | |
|---|---|
| Fields name | Description |
| Parameter to calculate the paging occasion and DRX of the remote UE. | The following information may be include for calculate the paging occasion and DRX of the remote UE.<br>T: DRX cycle of the UE<br>N: number of total paging frames in T<br>Ns: number of paging occasions for a PF<br>PF_offset: offset used for PF determination<br>UE_ID: 5G-S-TMSI mod 1024<br>Note: this information may be only contained in the paging path discovery response from the gNB to UE-to-NW relay. |
| IDs of Relay UEs will traversed on the paging path | The ID of each Relay UE the paging path discovery response message is going to traverse. Each relay will delete its UE ID in this field when it forwards the message. |

At step 242, UE-to-NW relay UE 302 r uses information received in the message of step 241 to configure its adaptation layer to receive and forward paging messages for remote UE 201 in the future. If UE-to-Network Relay UE 203 monitors remote UE's 201 PO in addition to its own PO, UE-to-Network Relay UE 203 extracts the parameters to calculate the paging occasion of remote UE 201. UE-to-NW Relay UE 203 should also extract information about the next relay on the paging path. The information may be stored associated with remote UE ID or paging path ID. Thus, UE-to-NW Relay UE 203 can know which relay to forward the paging message in the future.

At step 243, UE-to-NW Relay UE 203 may forward the paging path discovery response message to the next relay UE (e.g., relay UE 202) on the paging path. UE-to-NW relay 203 may remove the parameter to calculate the paging occasion and DRX of remote UE 201 field in the paging path discovery response message before forwarding the message. Alternatively, UE-to-NW relay 203 may add the SL DRX configuration for the next hop relay UE about which slot to receiving paging messages in the future.

At step 244, relay UE 202 receives the paging path discovery response and uses information in the message to configure its adaptation layer to receive or forward paging messages for remote UE 201 in the future. Relay UE 202 should extract information about the next relay on the paging path. The information may be stored associated with remote UE ID or paging path ID. Thus, relay UE 202 can know which relay to forward the paging message in the future. Relay UE 202 may add the SL DRX information for remote UE 201 about which slot to receiving paging message in the future.

At step 245, relay UE 202 forwards the paging path discovery response message to remote UE 201. After receiving the message, the remote UE establishes a paging path from the gNB. Remote UE 201 stores the ID of UE-to-NW relay UE 203, the paging path ID, or the ID of relay UE that forwards the paging message to it in the future. Remote UE 201 may configure its DRX based on the SL DRX information in the message of step 244.

Figure 10:
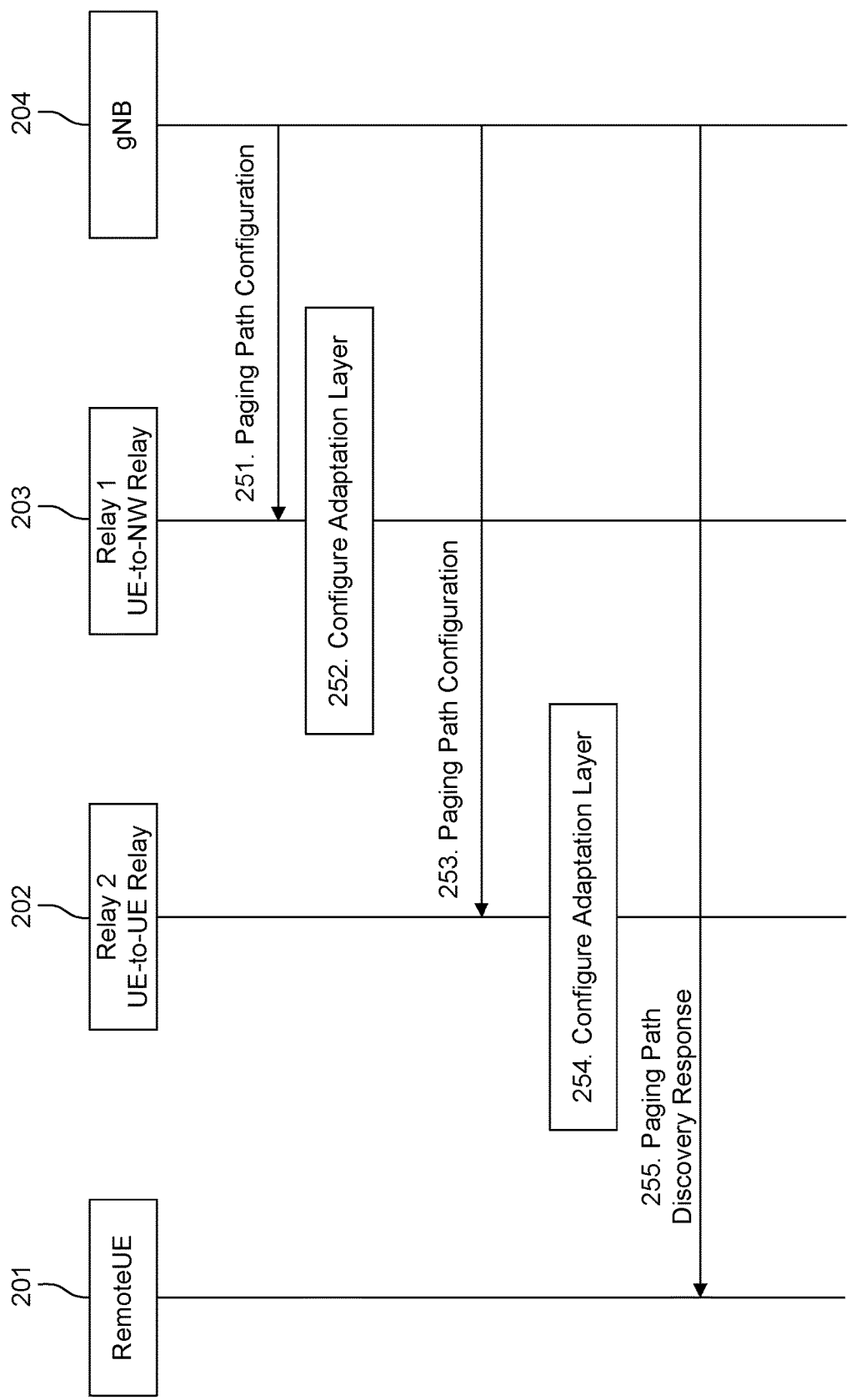
FIG. 10 illustrates an exemplary Hop by hop paging path configuration.

FIG. 10 provides an exemplary hop by hop paging path configuration. In the second disclosed procedure, gNB 204 sends a paging path configuration message to each relay UE on the paging path and configures the adaptation layer. After configuring each relay UE on the paging path, gNB 204 sends a paging path discovery response direct to remote UE 201.

At step 251, gNB sends the paging path configuration message to UE-to-NW relay 203 on the paging path. The message may include but not limited to information shown in Table 4.

TABLE 4

Paging path configuration message

| Fields name | Description |
|---|---|
| gNB ID | The ID, e.g. NR Cell Global Identifier (NCGI), of the gNB that configure the paging path for the remote UE. |
| Remote UE ID | Identification of the remote UE that is the destination of the paging path |
| RRC State of the remote UE | The RRC State of the remote UE, e g. RRC_INACTIVE, RRC_IDLE |
| UE-to-NW Relay UE ID | Identification of the UE-to-NW Relay UE that is on the paging path |
| Paging path ID | The ID of the paging path assigned by the gNB. |
| Paging Occasion configuration information | The Paging occasion information of the remote UE such as Paging frame number or Paging subframe number. |
| Parameter to calculate the paging occasion and DRX of the remote UE. | The following information may be include for calculate the paging occasion and DRX of the remote UE. T: DRX cycle of the UE N: number of total paging frames in T Ns: number of paging occasions for a PF PF_offset: offset used for PF determination UE_ID: 5G-S-TMSI mod 1024 |
| ID of Ingress UE | The ID of the UE from which the paging message to the remote UE comes. |
| ID of Egress UEs | The ID of the UEs to which the paging message to the remote UE should be forwarded. |

At step 252, UE-to-NW relay UE 203 receives the paging path configuration message and uses information in the message to configure the adaptation layer of UE-to-NW relay UE 203 to receive and forward paging messages for remote UE 201 in the future. If UE-to-Network Relay UE 203 monitors the PO of remote UE 201 in addition to its own PO, UE-to-NW relay UE 203 extracts the parameters to calculate the paging occasion of remote UE 201. UE-to-NW relay UE 203 should also exact information about the next relay on the paging path. The information is stored associated with remote UE ID or paging path ID. Thus, UE-to-NW relay UE 203 can know which relay to forward the paging message in the future.

At step 253, gNB 204 sends the paging path configuration message to the next relay UE 202 on the paging path. The message may include but not limited to information shown in Table 4.

At step 254, relay UE 202 uses information in the message of step 253 to configure its adaptation layer to receive or forward paging messages for remote UE 201 in the future. Relay UE 202 needs to extract information about the next relay on the paging path. The information may be stored associated with remote UE ID or paging path ID. Thus, relay UE 202 can know which relay to forward the paging message in the future.

At step 255, gNB 204 sends a paging path discovery response message to remote UE 101 on the paging path. The message may include but not limited to information shown in Table 4. After receiving the message, remote UE 201 may establish a paging path from the gNB. Remote UE may store the ID of UE-to-NW relay UE 2013, the paging path ID, or the ID of relay UE 202 that forwards the paging message to it in the future.

Paging Path Establishment Over Existing Paging Path

Figure 11:
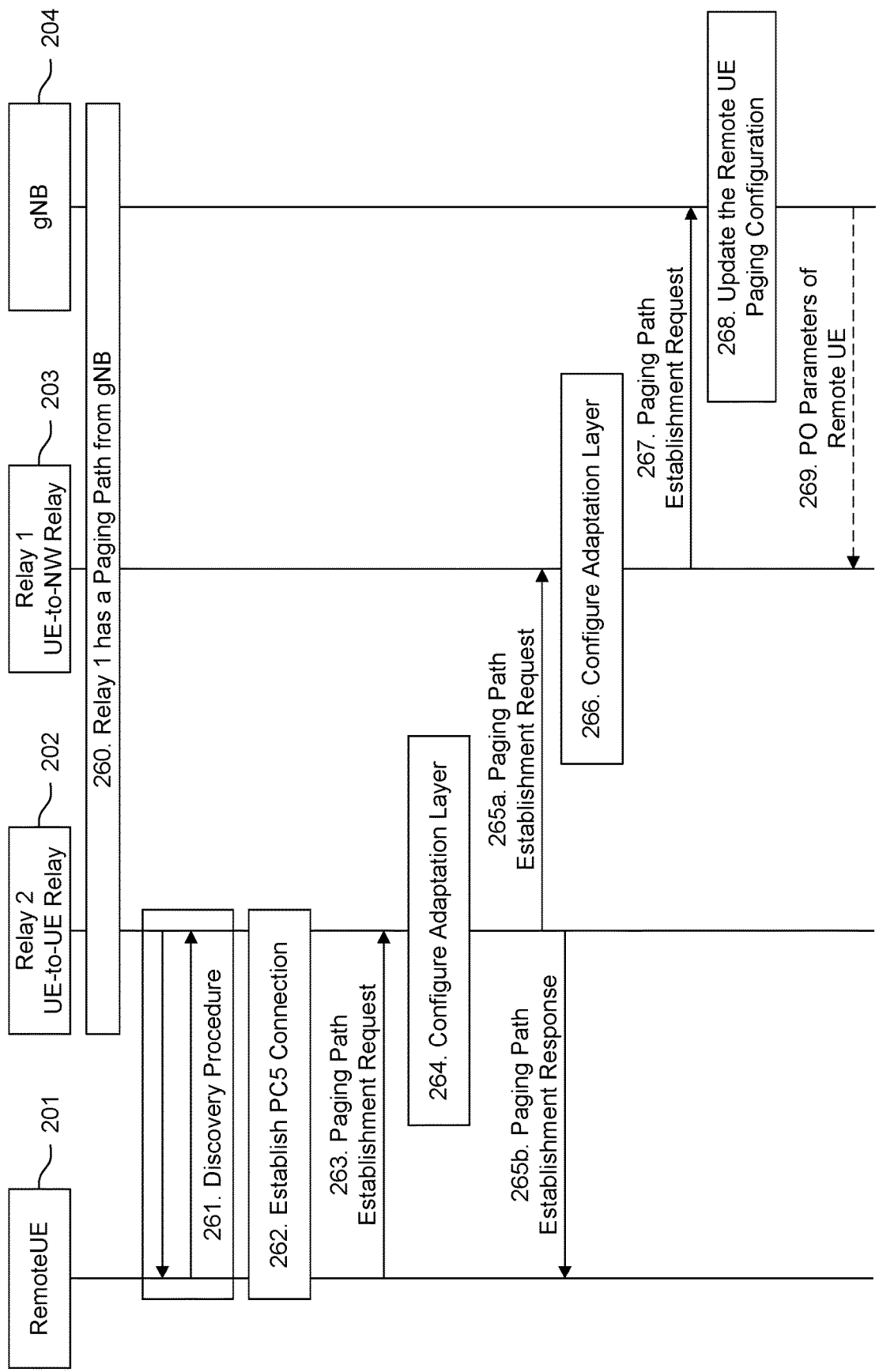
FIG. 11 illustrates an exemplary Paging Path Establishment over Existing Paging.

In this paging path establishment method, remote UE 201 selects one or more relay UEs that have established one or more paging paths to gNB 204, and then establishes its paging paths along the paging paths of the relay UE 202 by configuring the adaptation layer of UE-to-UE Relays and the UE-to-NW Relay on the paging path as shown in FIG. 11. In this method, one or more neighbor relay UEs have been established a paging path from gNB 204.

At step 260, a paging path has been established. At step 261, remote UE 201 and relay UE 202 discover each other via a discovery procedure. During the discovery procedure, relay UE 202 may broadcast or transmit its relay context information as shown in Table 1.

At step 262, remote UE 201 and the relay UE 202 may establish a PC5 connection after the discovery. Remote UE 201 may further collect information of relay UE 202, e.g. the link quality between relay UE 202, SL DRX cycle of relay UE 202.

At step 263, based on the discovered information, remote UE 201 selects one or more relay UEs that has established a paging path to gNB 204, and then sends a paging path establishment request message to relay UE 202. The paging path establishment request message may include but not limited to information shown in Table 5.

TABLE 5

Paging path establishment request message

| Fields name | Description |
|---|---|
| ID of the remote UE | Identification of the UE that initiates the paging path discovery request message. UE identity may include the NG-5G-S-TMSI, the I-RNTI-Value and AS ID of the UE. |
| RRC State of the remote UE | The RRC State of the remote UE, e.g. RRC_INACTIVE, RRC_IDLE |
| Parameter to calculate the paging occasion and DRX of the remote UE. | The following information may be included for calculate the paging occasion and DRX of the remote UE. T: DRX cycle of the UE N: number of total paging frames in T Ns: number of paging occasions for a PF PF_offset: offset used for PF determination UE_ID: 5G-S-TMSI mod 1024 |

At step 264, when relay UE 202 receives a paging path establishment request message, relay UE 202 determines whether to serve as a paging relay for remote UE 201 or allow remote UE 201 to share the same paging paths. If relay UE 202 determines to serve as a paging relay for remote UE 201 or allow remote UE 201 to share the same paging paths, relay UE 202 configures its adaptation layer to receive the paging message or forward the paging message to remote UE 201.

At step 265a, relay UE 202 forwards the paging path establishment request message towards gNB 204 along its paging path.

At step 265b, relay UE 202 sends a paging path establishment response to indicate whether to serve as a paging relay for the remote UE or allow the remote UE to share the same paging paths.

At step 266, relay UE 203 configures its adaptation layer to receive and forward the paging message to remote UE 201. When relay 203 in FIG. 11 receives a paging message to remote UE 201, relay 203 forwards to relay 202. If relay UE is UE-to-NW relay UE 203 and monitors the PO of remote UE 201 in addition to PO of relay UE 203, relay UE 203 extracts the parameters to calculate the paging occasion of remote UE 201 in the request. If UE-to-NW relay 203 cannot know the paging occasion based on the information in the paging path establishment request, relay 203 sends the paging path establishment request to gNB 204 to obtain the paging occasion of remote UE 201. Alternatively, if UE-to-NW relay 203 monitors its own PO only and paging for remote UE 201 is also sent in the UE-to-Network Relay UE's PO, relay 203 forwards the paging path establishment request to gNB 204 to inform gNB 204.

At step 267, relay UE 203 forwards the paging path establishment request message to gNB 204 since it has a direct connection with gNB 204.

At step 228, if UE-to-NW relay UE 203 monitors the PO of remote UE 201 in addition to its own PO, gNB 204 sends a response to UE-to-NW relay UE 203 with the parameters to calculate the paging occasion of the remote UE 201. Alternatively, if UE-to-NW relay 203 monitors its own PO only and paging for remote UE 201 is also sent in UE-to-Network Relay UE's PO, gNB 204 updates the paging configuration of remote UE 201 and sends the paging using its UE-to-NW relay PO.

At step 229, gNB 204 sends a response to UE-to-NW relay UE 203 with the parameters to calculate the paging occasion of remote UE 201. The gNB 204 may also include the UE ID, or the I-RNTI-Value of remote UE 201 in the response.

Paging Propagation

Figure 12:
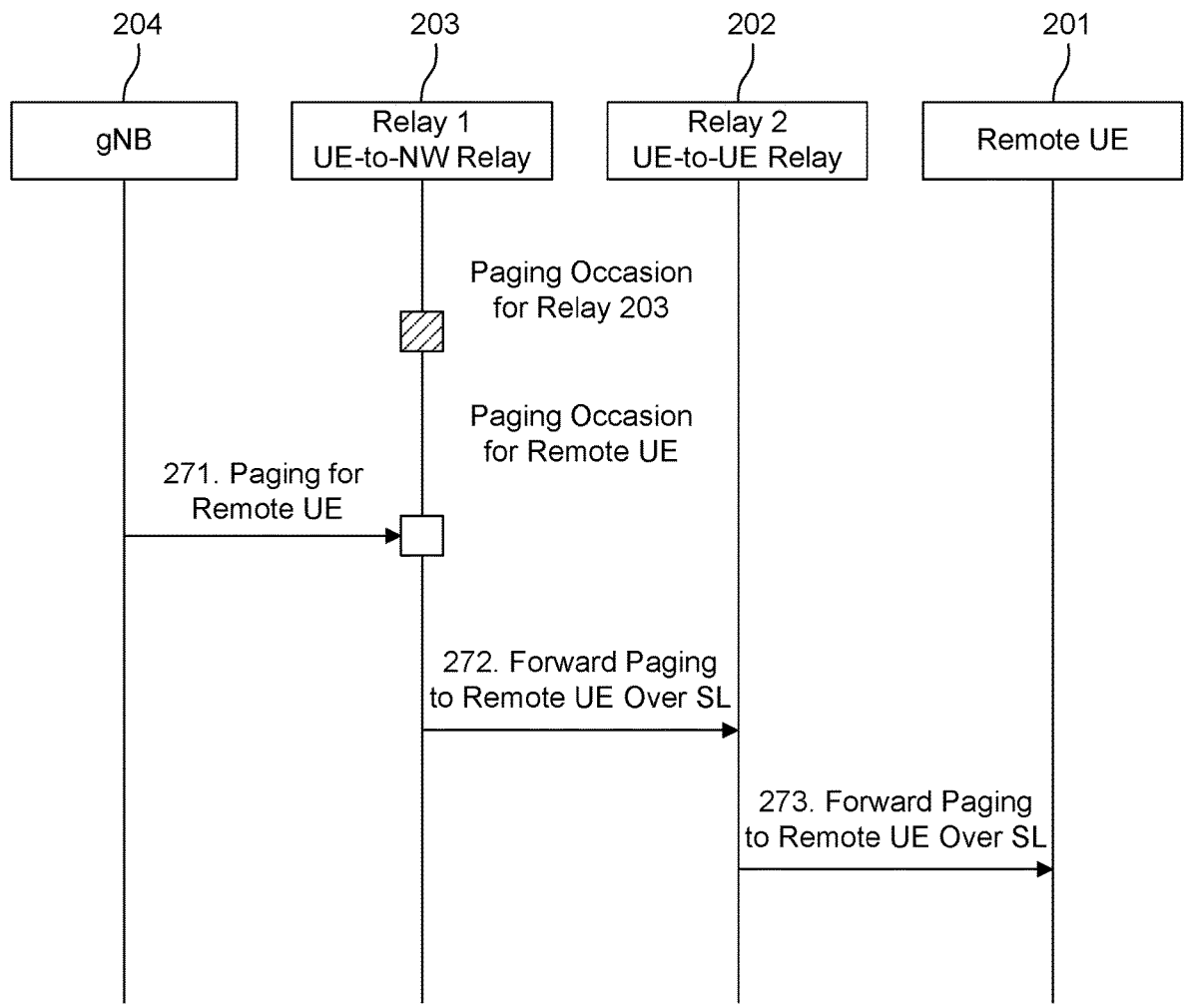
FIG. 12 illustrates an exemplary Paging propagation procedure if UE-to-Network Relay UE monitors the remote UE's PO in addition to its own PO.

Methods are disclosed with regard to how a paging message is propagated from a gNB to a remote UE via an established paging path. In the first disclosed method, UE-to-NW Relay UE 203 monitors the PO of remote UE 201 in addition to its own PO as shown in FIG. 12. In the paging message sent from gNB 204 at step 271, the paging UE identity field in the paging record is the ID of remote UE 201 or the ID of the paging path associated with remote UE 201. Upon receiving the paging message, for each of paging record, if the UE Identity in the paging record matches the UE identity of remote UE 201 that UE-to-NW relay 203 monitors, UE-to-NW relay 203 forwards (see step 272) the paging message to the next relay UE, e.g. relay 202 over the Sidelink. At step 273, the adaptation layer of relay 202 forwards the paging message to remote UE 201.

Figure 13:
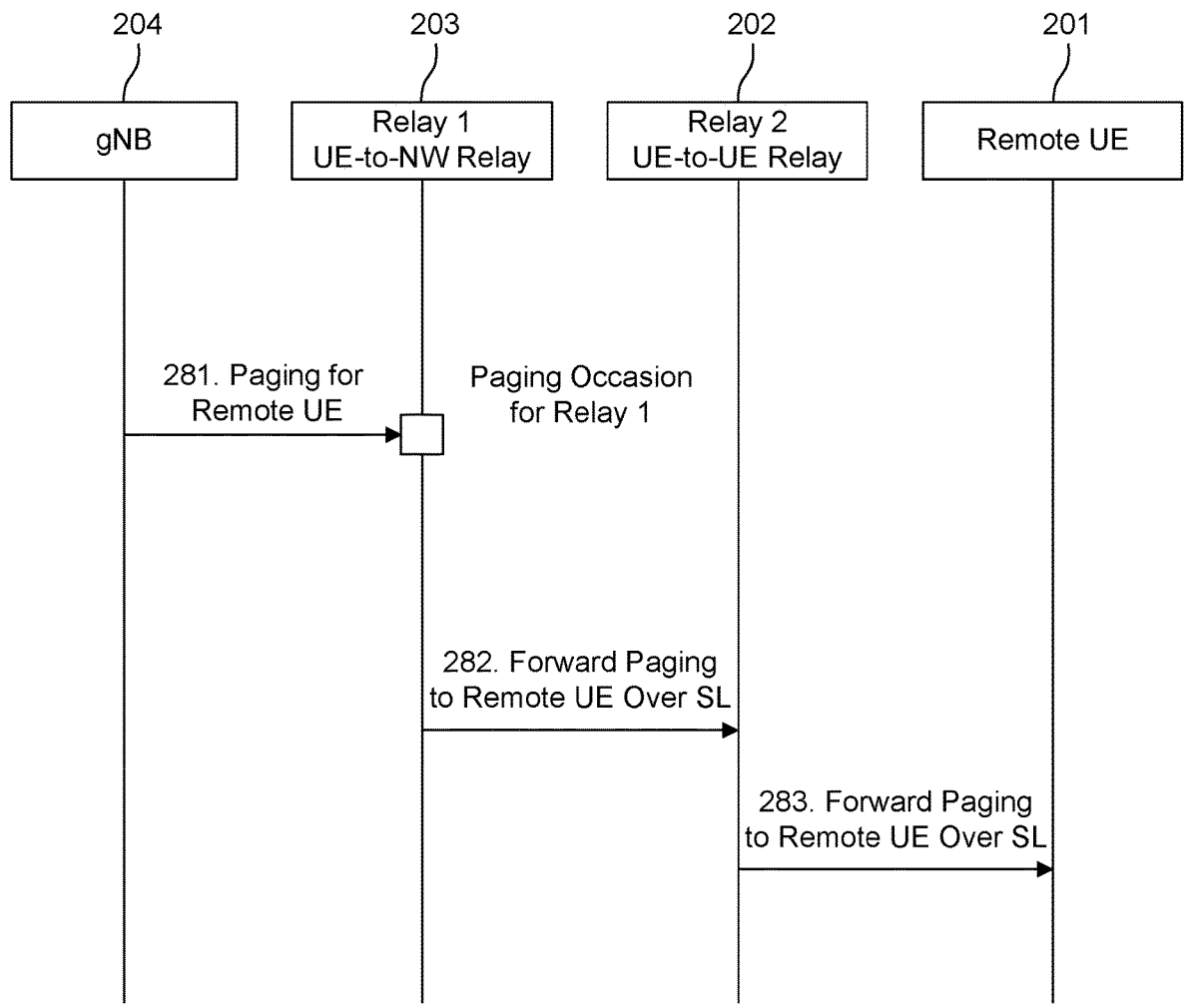
FIG. 13 illustrates an exemplary Paging propagation procedure if the UE-to-NW relay monitors its own PO only and paging for the remote UE is also sent in the UE-to-Network Relay UE's PO.

In the second disclosed method, the UE-to-NW relay monitors its own PO only and paging for the remote UE is also sent in the UE-to-Network Relay UE's PO as shown in FIG. 13. At step 281, in the paging message sent from gNB 204, the paging UE identity field in the paging record may be the ID of UE-to-NW relay 203, an additional field is added in the paging record to indicate the destination UE identity of the paging message, e.g. identity of remote UE 201. Alternatively, in the paging message sent from gNB 204, the UE identity field in the paging record may be the ID of the destination UE, e.g. identity of remote UE 201. Upon receiving the paging message, for each of paging record, if the destination UE Identity in the paging record matches the UE identity of remote UE 201 that UE-to-NW relay 203 monitors, UE-to-NW relay 203 forwards (see step 282) the paging message to the next relay UE, e.g. relay 202 over the sidelink. Similarly, at step 283, the adaptation layer of relay 202 forwards the paging message to remote UE 201. In another alternative, in the paging message sent from gNB 204 at step 281, the paging UE identity field in the paging record may be the ID of UE-to-NW relay 203 and no additional field is added in the paging record to indicate the destination UE identity of the paging message, e.g. identity of remote UE 201. Upon receiving the paging message, UE-to-NW relay 203 forwards (see step 282) the paging message to each remote UE it monitors. In each forwarding, UE-to-NW relay 203 inserts the identity of remote UE 201 and forwards the paging message to the next relay UE, e.g. relay 202 over the sidelink. Similarly, the adaptation layer of relay 202 forwards (see step 283) the paging message to the remote UE.

Paging Path Maintenance and Reachability Management

To address issue 5 and 6 of the problem statement, methods are disclosed that the remote UE, UE-to-UE relays and UE-to-NW relays in the network may dynamically maintain the paging path between the remote UE and gNB when the topology changes. Disclosed are exemplary scenarios that a paging path is changed. In a first scenario, remote UE 201 selects a new relay UE and establishes a new paging path to gNB 204. In the second scenario, one of relay UEs on the paging path of remote UE 201 selects a new relay UE and establishes a new paging path to gNB 204. In this scenario, the paging path of remote UE 201 also should be updated. A number of events may trigger the UE for the paging path reselection, based on the change of status of the sidelink, e.g., signal quality of the link, and the status of neighbor relay UEs, e.g. a neighbor relay UE is fewer hops away from gNB or has more sidelink capacity, or lighter load, etc.

Figure 14:
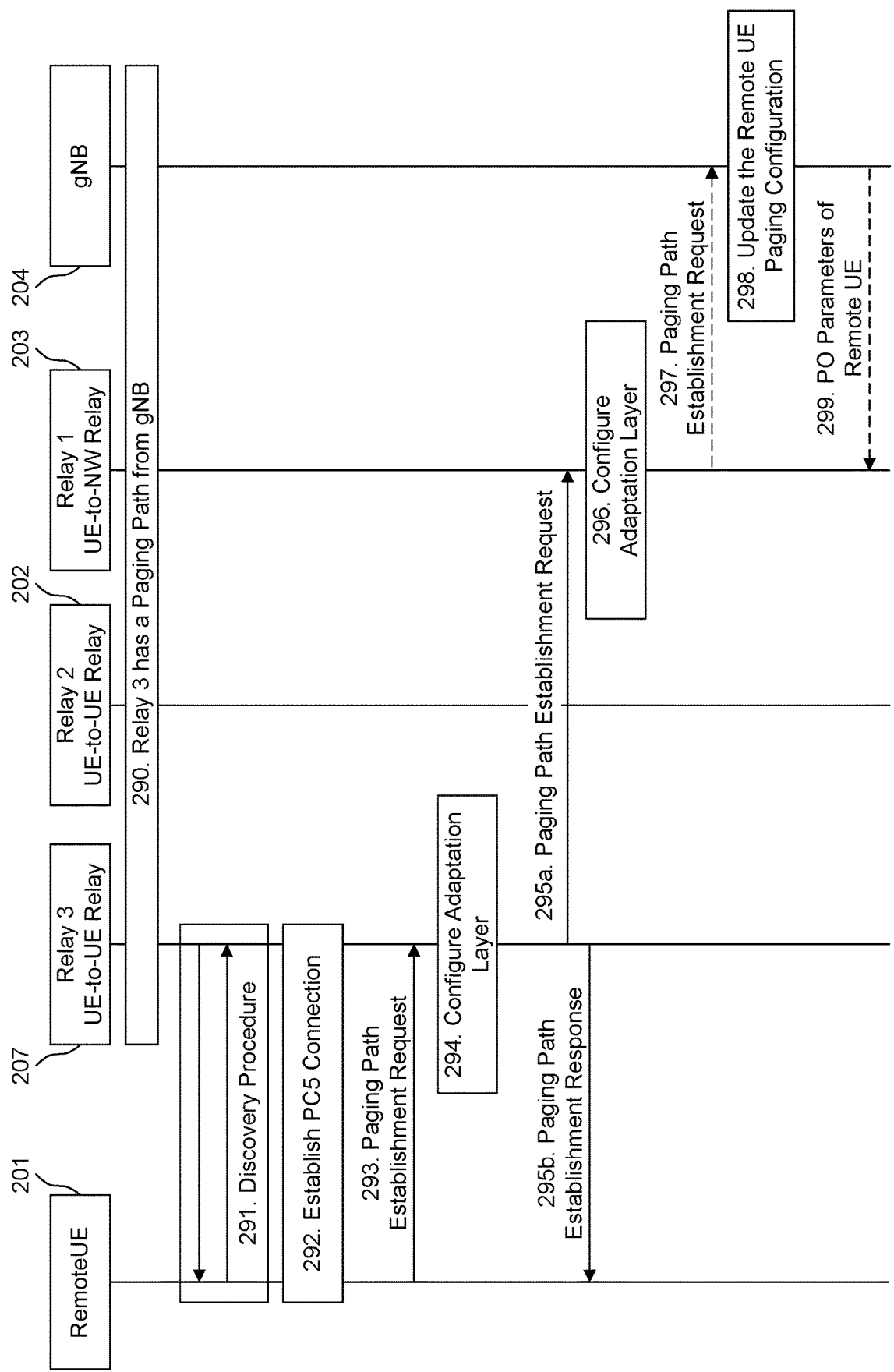
FIG. 14 illustrates an exemplary Paging path establishment procedure for a remote UE to reselect a new relay UE.

The procedure for a remote UE to select a new relay UE and establish a new relay path is shown in FIG. 14. In FIG. 14, remote UE 201 at step 290 has established a paging path via relay 202 and intends to establish a new paging path via relay 207. The procedure is similar to the paging path establishment procedure associated with Paging Path Establishment over Existing Paging Path. When remote UE 201 discovers a new relay UE, e.g. relay 207, relay UE 207 can obtain the ID of UE-to-NW relay UE 203 associated with relay 203 in step 291. In the scenario that UE-to-NW relay 203 associated with relay 207 is the same as UE-to-NW relay 203 on its previous paging path, remote UE 201 may not need to include its parameter to calculate the paging occasion and DRX in the paging path establishment request in step 293. In this scenario, UE-to-NW relay 203 does not need to send a paging path establishment request to gNB 204 if it still has the parameter to calculate the paging occasion and DRX of remote UE 201 as in step 297. Step 292 is the same as step 262 in FIG. 11. Step 294-296 are the same as step 264-296 in FIG. 11. Step 298-299 are the same as step 268-269 in FIG. 11.

Figure 3:
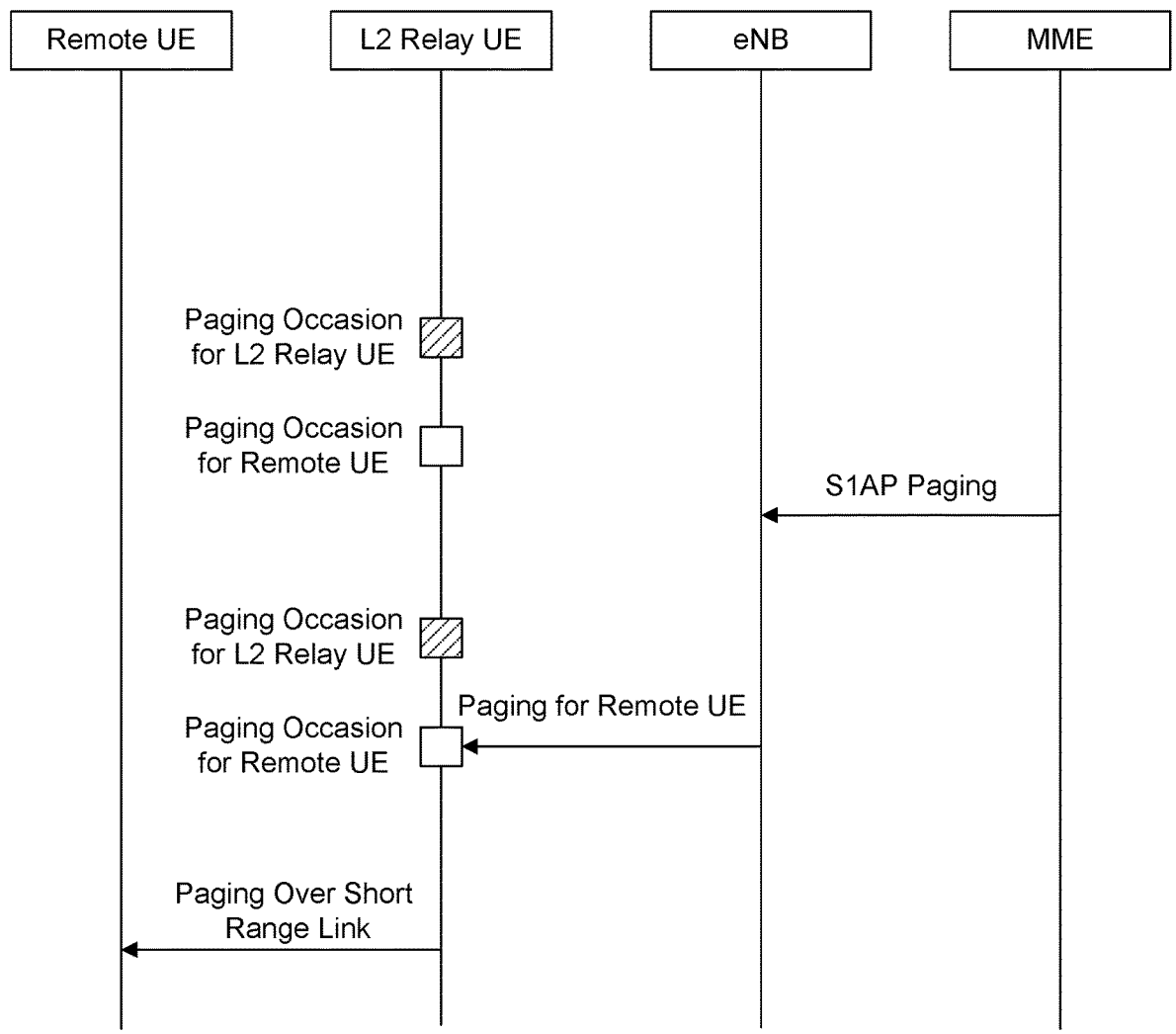
FIG. 3 illustrates an exemplary Paging for evolved ProSe Remote UE (Option 1)
Figure 4:
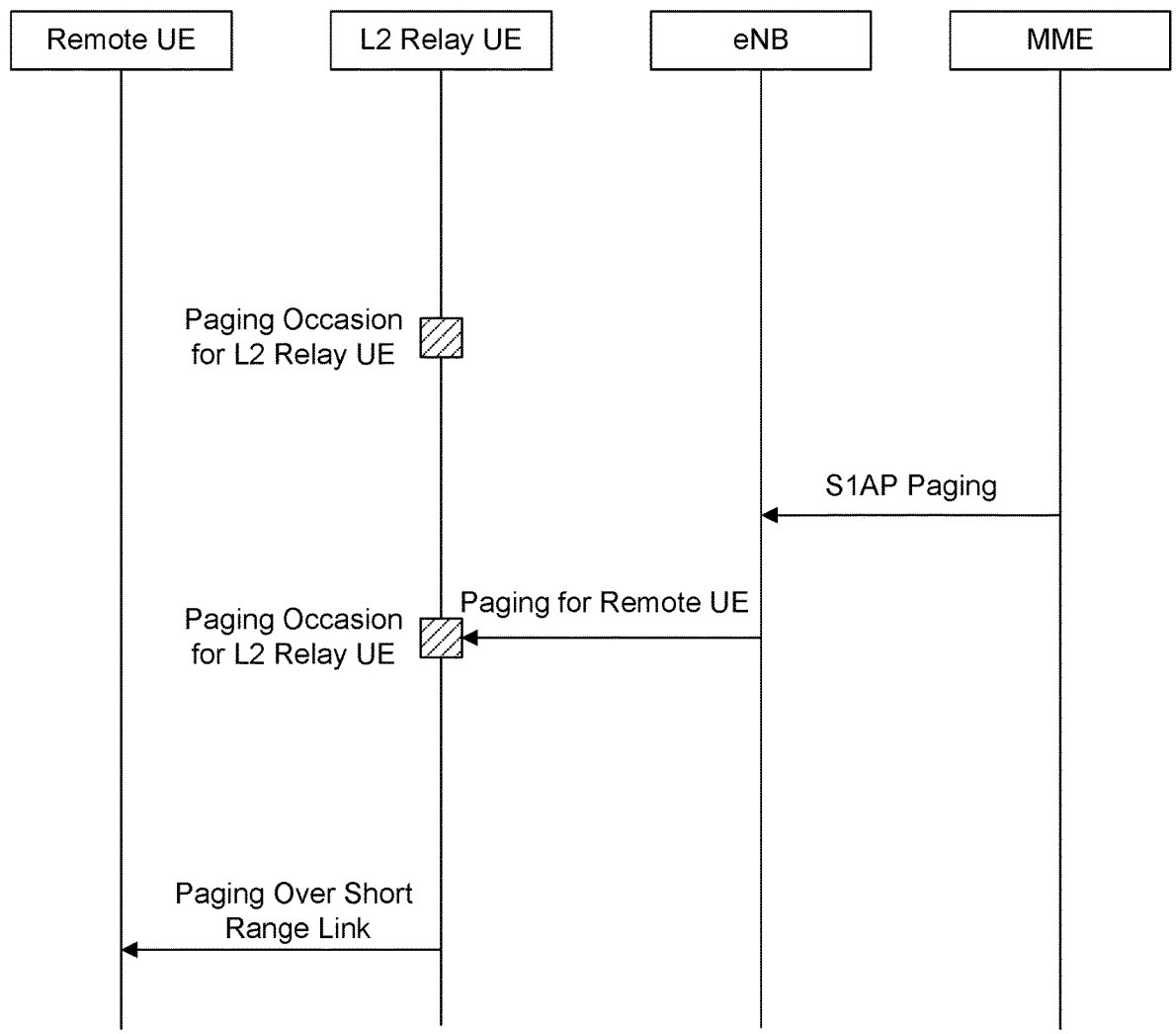
FIG. 4 illustrates an exemplary Paging for evolved ProSe Remote UE (Option 2)
Figure 15:
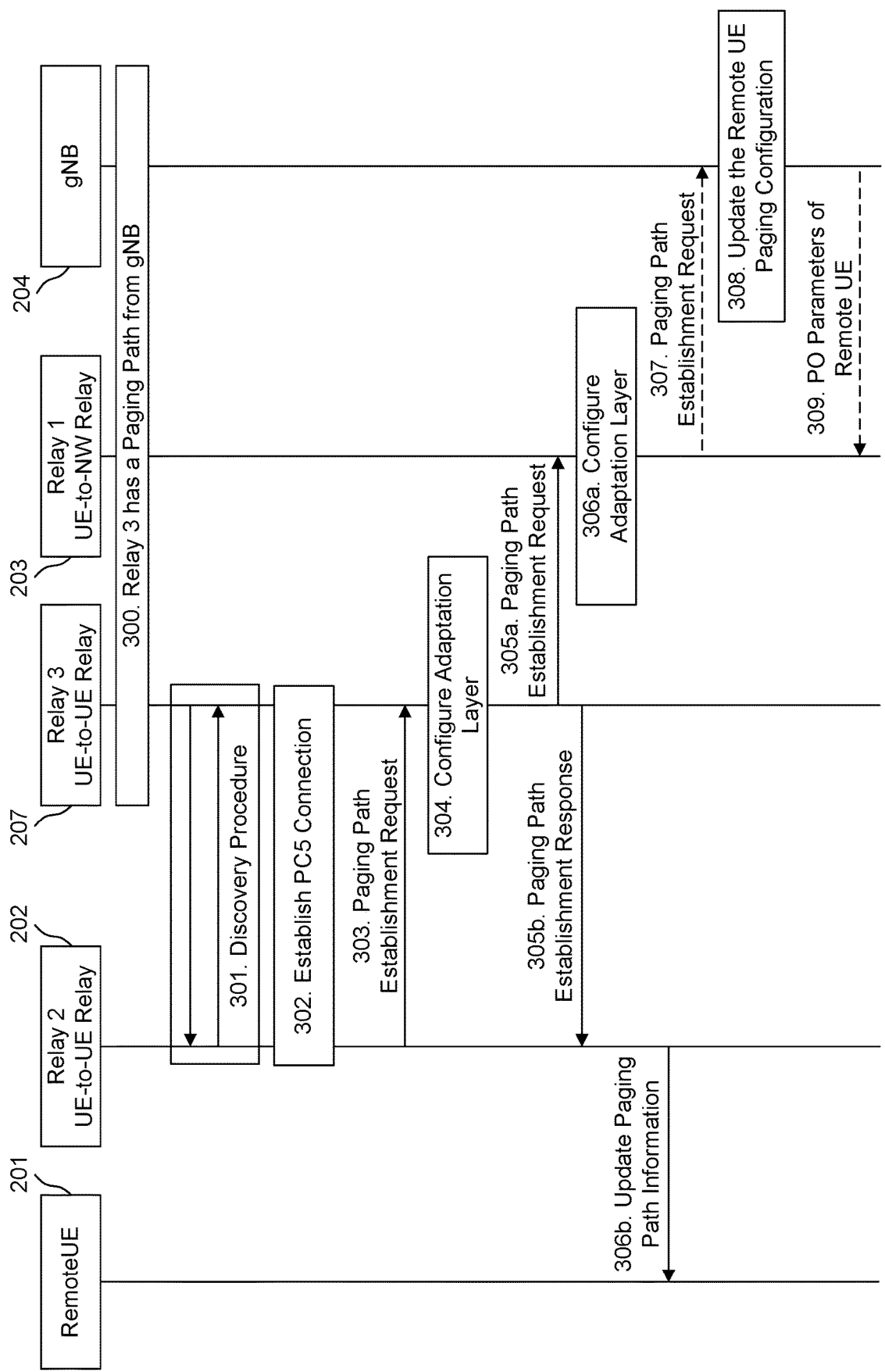
FIG. 15 illustrates an exemplary Paging path establishment procedure when a relay UE reselect a new relay UE.

The procedure when one of relay UEs on the paging path of the remote UE selects a new relay UE is shown in FIG. 15. In FIG. 15, remote UE 201 has established, at a first period, a paging path via relay 202 and relay 202 intends, at a second period, to establish a new paging path via relay 207. Relay 202 should establish a new paging path to gNB 204. The procedure (e.g., FIG. 15) is similar to the paging path establishment procedure associated with Paging Path Establishment over Existing Paging Path (e.g., FIG. 11). During the paging path establishment procedure, relay 202 sends the paging path establishment request at step 303 to all relay UEs on its paging path, e.g. relay 207 and UE-to-NW relay 203, to re-establish paging path for all UEs that it forwards paging message to. For example, in step 303 relay 202 indicates in the paging path establishment request that a paging path also needs to be re-established for remote UE 201. Upon receiving the message of 303, relay 207 configures its adaptation layer (at step 304) to forward paging for both remote UE 201 and relay 202 (step 305a and step 305b). Similarly, when relay 207 forwards the paging path establishment request to UE-to-NW relay in step 305a, relay 207 indicates that a paging path also needs to be re-established for remote UE 201 and relay 202. Upon receiving the message, UE-to-NW relay 203 configures (at step 306a) its adaptation layer to forward paging for both remote UE 201 and relay 202. If UE-to-NW relay 203 on the paging path is changed and option 1 approach (e.g., FIG. 3) is used, the paging path establishment also includes the parameter to calculate the paging occasion and DRX of relay 202 and remote UE 201 in the paging path establishment. If UE-to-NW relay 203 does not know the parameter to calculate the paging occasion and DRX of relay 202 or remote UE 202, relay 203 can send requests to relay 202, remote UE 201, or gNB 204 to obtain this information. If the UE-to-NW relay 203 on the paging path is changed and option 2 approach (e.g., FIG. 4) is used, UE-to-NW relay 203 forwards the paging path establishment request at step 307 to gNB 204 that the paging for remote UE 201 should be sent in the new UE-to-Network Relay UE's PO. If the UE-to-NW relay 203 on the paging path is changed, the relay 202 needs to update new paging path information to the UEs that it forwards paging message to. For example, relay 202 informs remote UE 201 about the information of the new UE-to-NW relay 203. Those steps that are not explicitly called out are the same as steps in FIG. 11.

Figure 16:
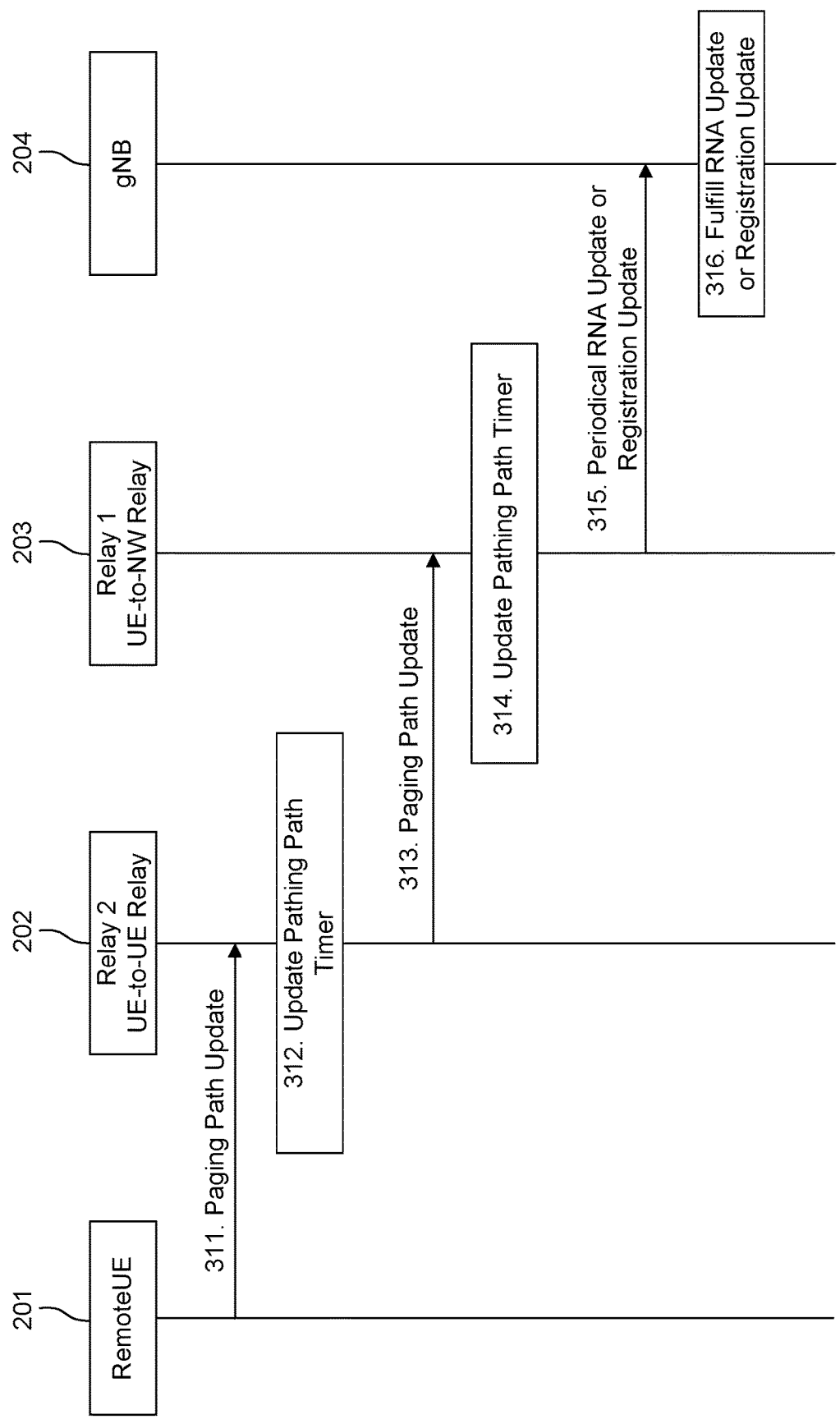
FIG. 16 illustrates an exemplary Paging path update for remote UE reachability management.

A remote UE should maintain the paging path by periodically sending path updates. During the paging path establishment, a paging path update timer may be configured at remote UE 201 by gNB 204 or relay UEs on the paging path. The paging path update timer may be smaller than the periodical registration update timer and RAN Notification Area update of the UE-to-NW relay associated with the remote UE. Upon the paging path update timer expiring, remote UE 201 sends a paging path update at step 311 towards gNB 204 to update the reachability of the network as shown in FIG. 16. The paging path update may include the ID of remote UE 201 or paging path ID. When a relay UE on the path, e.g. relay 202, receives the paging path update from remote UE 201, relay UE 202 knows remote UE can still be reached via the page path and reset the timer associated the paging path of remote UE 201 as shown in step 312. If relay UE 202 is not the UE-to-NW relay 203, relay 202 forwards the paging path update to the next relay towards gNB 204 as in step 313. Relay UE 202 may also piggy back (e.g., insert) its UE ID or paging path ID when forwarding the paging path to the next relay UE on the paging path. In this scenario, the paging path update may include UE reachability information of remote UE 201 or relay 202. When the next relay UE on the paging path receives the message, e.g. Relay 202, it extracts the reachability information and knows remote UE 201 and relay 202 can still be reached via the page path and reset the timer associated the paging path of remote UE 201 and relay 202 as shown in step 314. If relay UE 202 is the UE-to-NW relay 203 of remote UE 201, relay 203 sending an RNA update or registration update to gNB 204 depends on its RRC state (see step 315). Further explaining step 315, Note that since remote UE 201 does not have a direct link with gNB 204, the RRC state of remote UE 201 may be the same with UE-to-NW relay 203 on its paging path, and UE-to-NW relay fulfills the RNA update and registration update on behalf of the remote UE 201 and all UEs it forwards paging message to. At step 316, fulfill RNA update or registration update.

Figure 17:
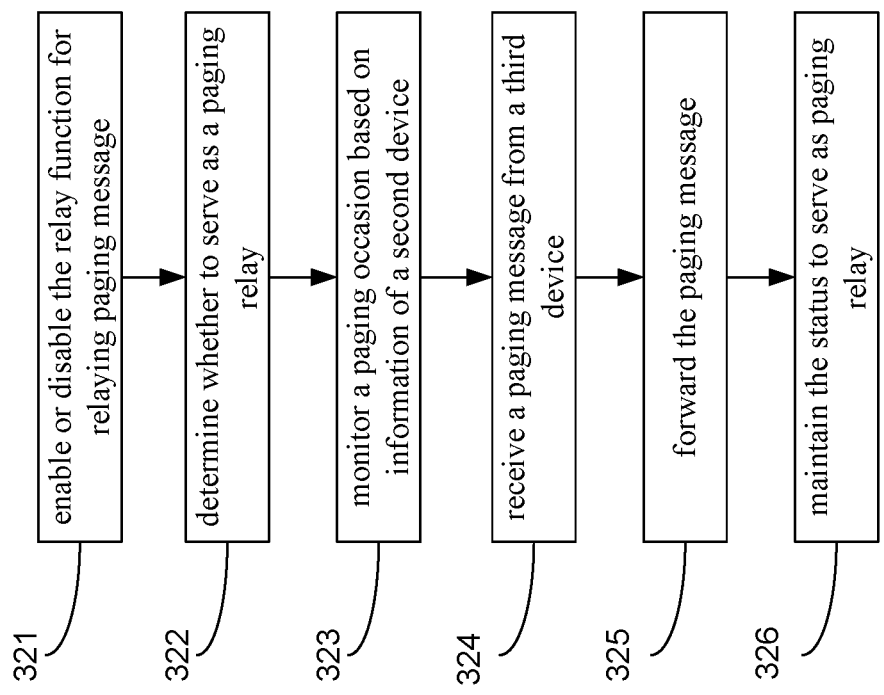
FIG. 17 illustrates an exemplary Paging method.

FIG. 17 illustrates an exemplary method for paging UE. As disclosed herein, it is contemplated that subject matter associated with other FIGs, such as FIG. 7, FIG. 8, FIG. 9, FIG. 10, FIG. 11, FIG. 12, FIG. 14, FIG. 15, FIG. 16, Table 3, Table 4, or the like may be combined.

At step 321, a first device (UE-to-UE relay 202) may enable or disable the relay function for relaying paging message. A trigger to enable may be a self-initiated request or a request from an external physical or virtual device. The request may include configurations for serving as a paging relay or the configurations may be obtained after the determination of step 322. The configurations may include the paging occasion or the parameter to calculate paging occasion for the second device, an indication of the next device to forward the paging message toward. For example, see Table 3 or Table 4.

At step 322, determine whether to serve as a paging relay (e.g., enable or disable relay function) for a second device (e.g., UE 201). Step 322 may be triggered by the request of step 321 or another request. The determination may be based on status (e.g., capacity). For example, if the battery power of the UE is below a pre-configured threshold, the UE can disable its relay function. The determination may be based on proximity. For example, whether or not there is a relay UE that broadcasts relay context information in the first device's vicinity, such as within threshold radial distance (e.g., within 400 feet). The determination may be based on analysis of relay context information (e.g., one or combination of relay context information of Table 1). For example, detection of a particular TrackingAreaCode may help determine whether to disable or enable paging relay function. The determination may be based on analysis of criteria received from the second device. At step 323, the first device may monitor a paging occasion based on information of a second device (e.g., UE-to-NW relay 203 or UE 201). This information may be received from the second device, preconfigured, or the like. At step 324, if the first device determines and also is enabled as a paging relay, the first device may receive and process a paging message from a third device (e.g., UE-to-NW relay 203 or gNB 204). At step 325, the first device may forward the paging message from one or more other devices (e.g., the third device). At step 326, the first device may maintain (e.g., update) the status as paging relay for the second device. Other devices (e.g., the third device and second device) may be sent messages with an update of the status. The paging path may be updated based on a detection of a topology change or threshold signal quality, among other things. The first device may serve as paging relay or disable such function. The second device may be a remote UE (e.g., UE 201). The third device may be a base station.

It is understood that the entities performing the steps illustrated herein may be logical entities. The steps may be stored in a memory of, and executing on a processor of, a device, server, or computer system such as those illustrated in FIG. 19F or FIG. 19G. Skipping steps, combining steps, or adding steps between exemplary methods disclosed herein (e.g., FIG. 7-FIG. 16) is contemplated. Table 6 provides abbreviations and definitions for subject matter herein.

TABLE 6

Abbreviations and Definitions

| Abbreviations | Definitions |
| --- | --- |
| 3GPP | 3rd Generation Partnership Project |
| ACK | ACKnowledgement |
| APP | Application |
| AS | Access Stratum |
| D2D | Device to Device Communication |
| eNB | Evolved Node B |
| gNB | NRNodeB |
| ID | Identity or Identifier |
| ITS | Intelligent Transport System |
| ITS-AID | ITS Application Identifier |

TABLE 6-continued

Abbreviations and Definitions

| Abbreviations | Definitions |
| --- | --- |
| LCH | Logical Channel |
| LTE | Long Term Evolution |
| MAC | Medium Access Control |
| NAS | Non AS |
| NB | NodeB |
| NR | New Radio |
| PC5 | The reference point between ProSe-enabled UEs used for control and user plane for ProSe Direct Discovery, ProSe Direct Communication and ProSe UE-to-Network Relay |
| PDCP | Packet Data Convergence Protocol |
| PDU | Protocol Data Unit |
| PHY | PHYsical layer |
| ProSe | Proximity-Based Services |
| PSID | Provider Service Identifier |
| QoS | Quality of Service |
| SDU | Service Data Unit |
| SL | Sidelink |
| RAN | Radio Access Network |
| RLC | Radio Link Control |
| RRC | Radio Resource Control |
| RSU | Road Side Unit |
| UE | User Equipment |
| UL | Uplink |
| ULG | Upper Layer Group |
| V2X | Vehicle-to-X Communication |

Figure 18:
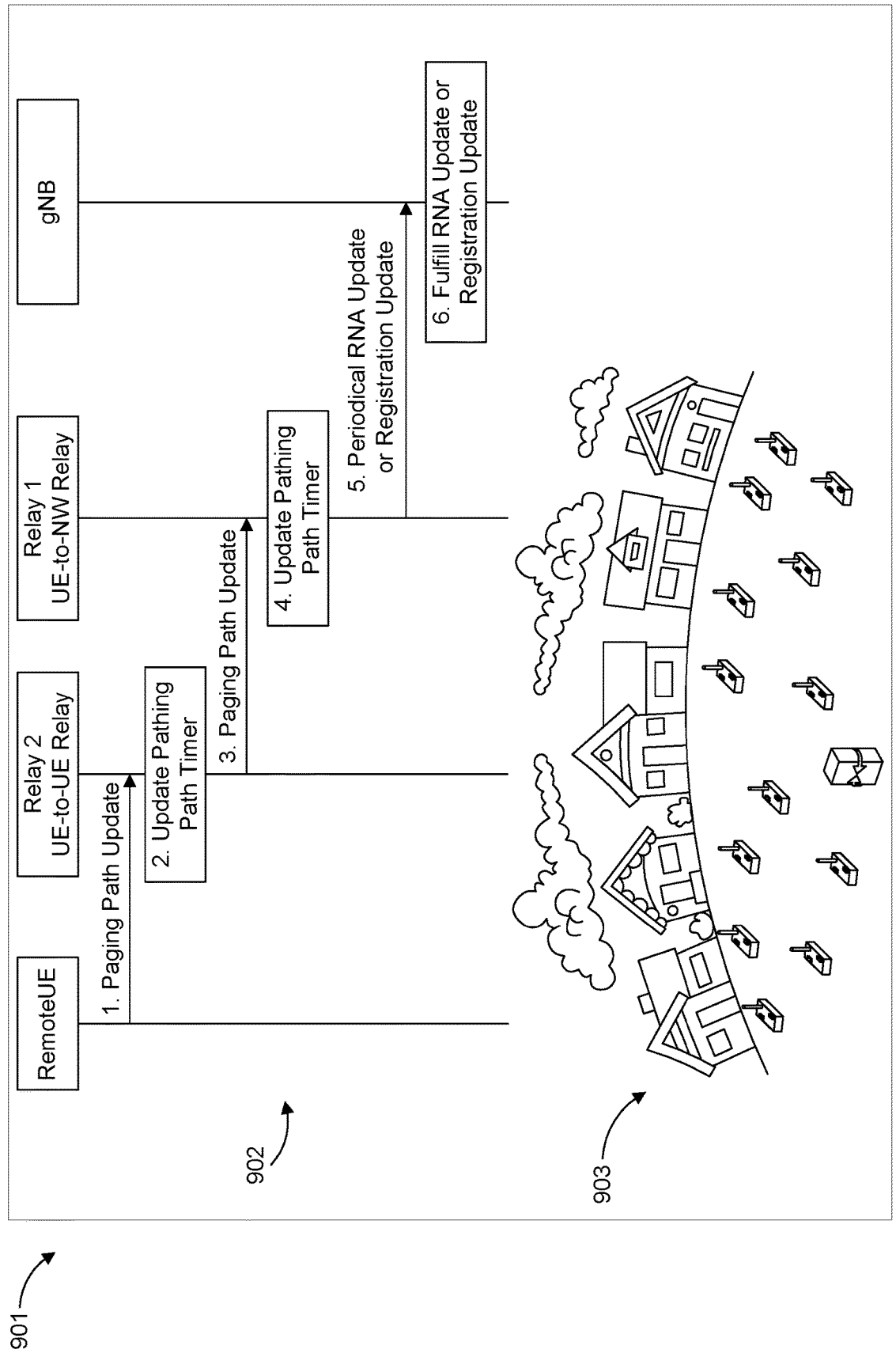
FIG. 18 illustrates an exemplary display (e.g., graphical user interface) that may be generated based on the methods, systems, and devices for paging a remote UE.

FIG. 18 illustrates an exemplary display (e.g., graphical user interface) that may be generated based on the methods, systems, and devices of methods and apparatus for paging a remote UE, as discussed herein. Display interface 901 (e.g., touch screen display) may provide text in block 902 associated with methods and apparatus for paging remote UE, such as RRC related parameters. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices for paging remote UEs, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 19A:
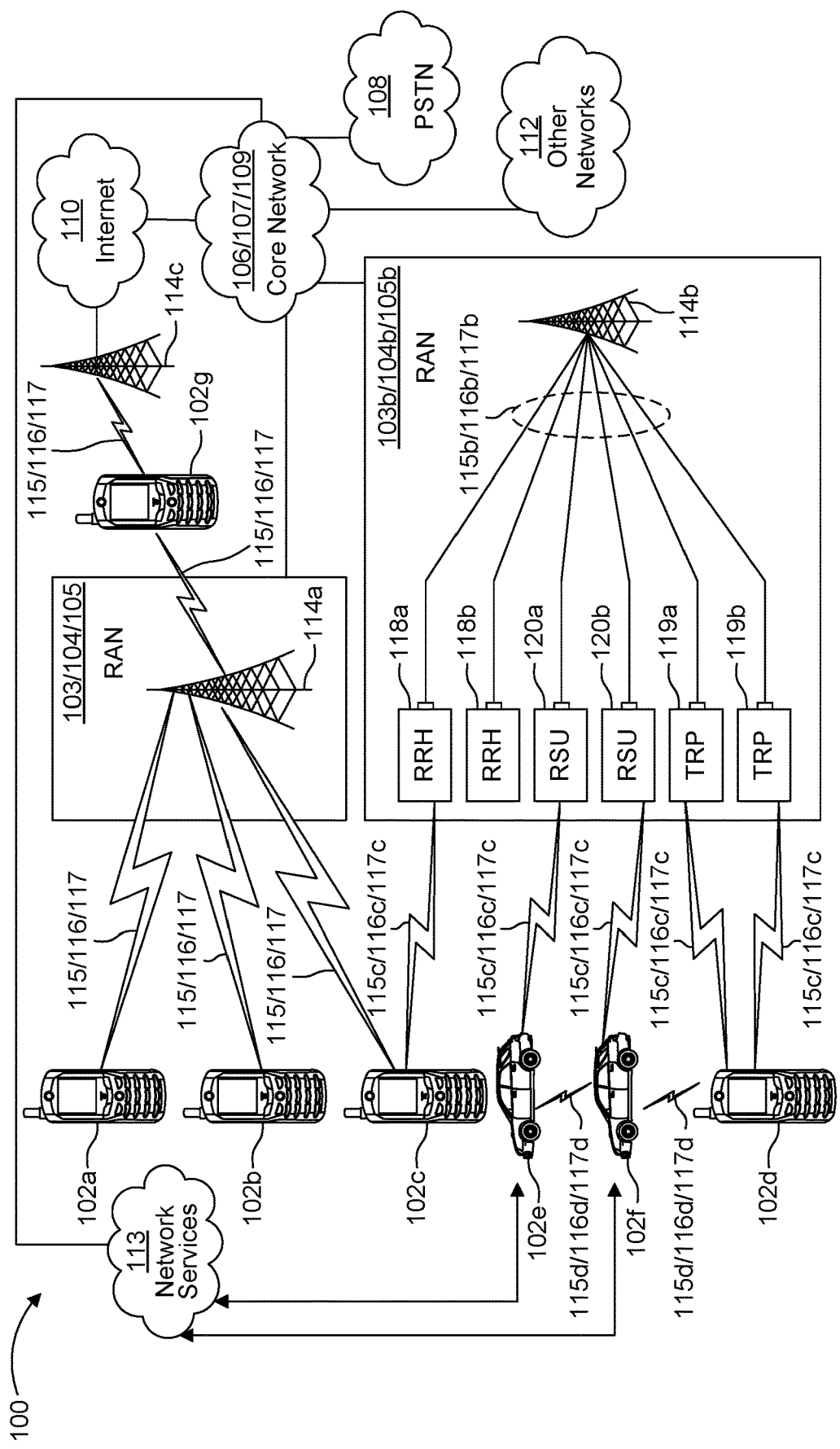
FIG. 19A illustrates an example communications system.

FIG. 19A illustrates an example communications system 100 in which the methods and apparatuses of for paging a remote UE, such as the systems and methods illustrated in FIG. 9 through FIG. 16 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 19A, FIG. 19B, FIG. 19C, FIG. 19D, FIG. 19E, or FIG. 19F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 19A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of for paging a remote UE, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 19A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices for paging a remote UE, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 19A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 19A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices for paging a remote UE, as disclosed herein. For example, the WTRU 102g shown in FIG. 19A may be configured to communicate with the base station 114a, which may employ a cellular-based radio technology, and with the base station 114c, which may employ an IEEE 802 radio technology.

Although not shown in FIG. 19A, it will be appreciated that a User Equipment may make a wired connection to a gateway. The gateway maybe a Residential Gateway (RG). The RG may provide connectivity to a Core Network 106/107/109. It will be appreciated that many of the ideas included herein may equally apply to UEs that are WTRUs and UEs that use a wired connection to connect with a network. For example, the ideas that apply to the wireless interfaces 115, 116, 117 and 115c/116c/117c may equally apply to a wired connection.

Figure 19B:
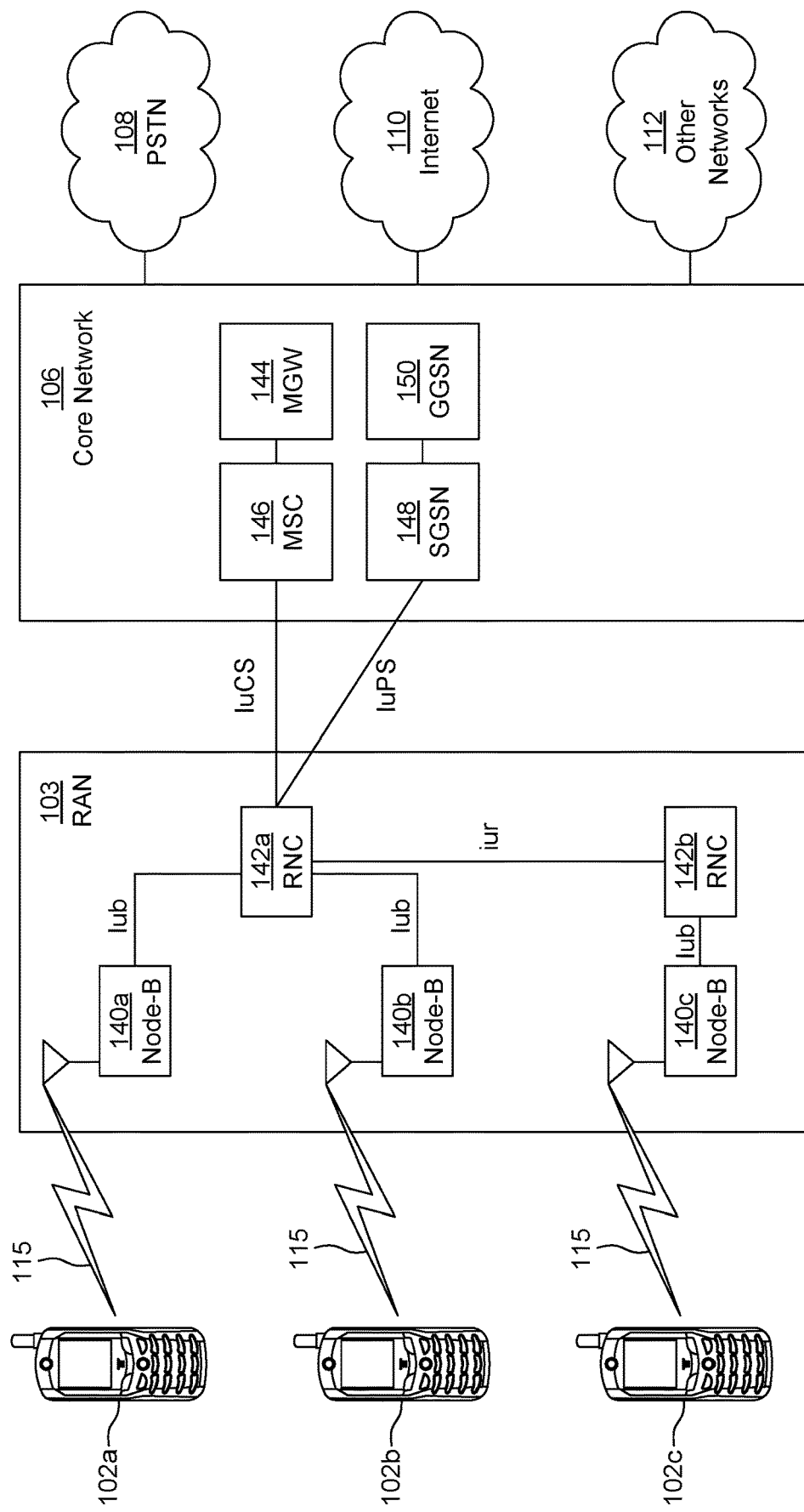
FIG. 19B illustrates an exemplary system that includes RANs and core networks.

FIG. 19B is a system diagram of an example RAN 103 and core network 106 that may implement methods, systems, and devices for paging a remote UE, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 19B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 19B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 19B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 19C:
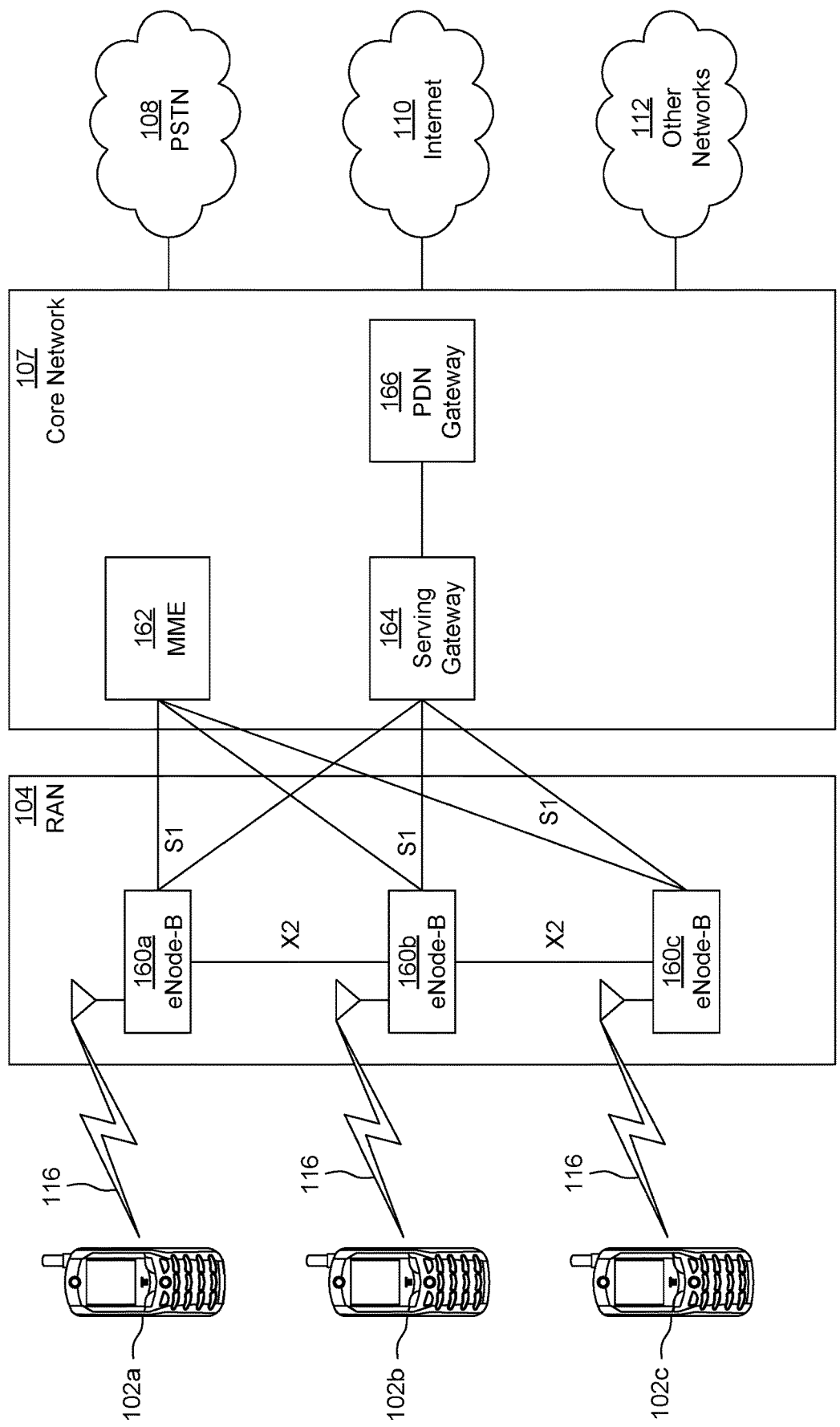
FIG. 19C illustrates an exemplary system that includes RANs and core networks.

FIG. 19C is a system diagram of an example RAN 104 and core network 107 that may implement methods, systems, and devices for paging a remote UE, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 19C, the eNode-Bs 160a, 160b, and 160c may communicate with one another over an X2 interface.

The core network 107 shown in FIG. 19C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 19D:
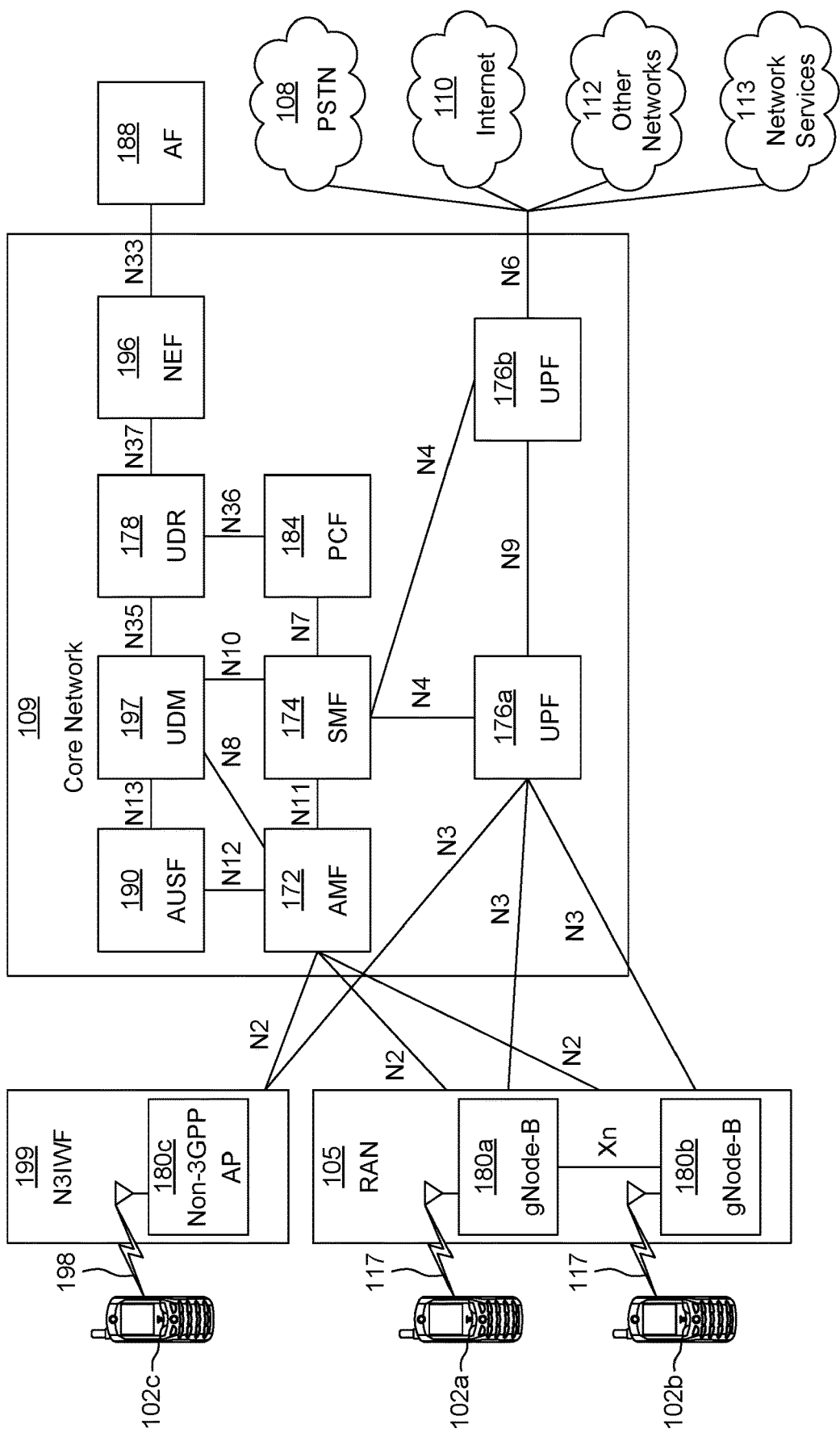
FIG. 19E illustrates another example communications system.
FIG. 19F is a block diagram of an example apparatus or device, such as a WTRU.
FIG. 19G is a block diagram of an exemplary computing system.

FIG. 19D is a system diagram of an example RAN 105 and core network 109 that may implement methods, systems, and devices for paging a remote UE, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 19D, the gNode-Bs 180a and 180b may communicate with one another over an Xn interface, for example.

The core network 109 shown in FIG. 19D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 19G.

In the example of FIG. 19D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 19D shows that network functions directly connect with one another, however, it should be appreciated that they may communicate via routing agents such as a diameter routing agent or message buses.

In the example of FIG. 19D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 19D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 19D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connects with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 19D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 19A, FIG. 19C, FIG. 19D, or FIG. 19E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 19A, FIG. 19B, FIG. 19C, FIG. 19D, or FIG. 19E are provided by way of example only, and it is understood that the subject matter disclosed and claimed herein may be embodied or implemented in any similar communication system, whether presently defined or defined in the future.

Figure 19E:
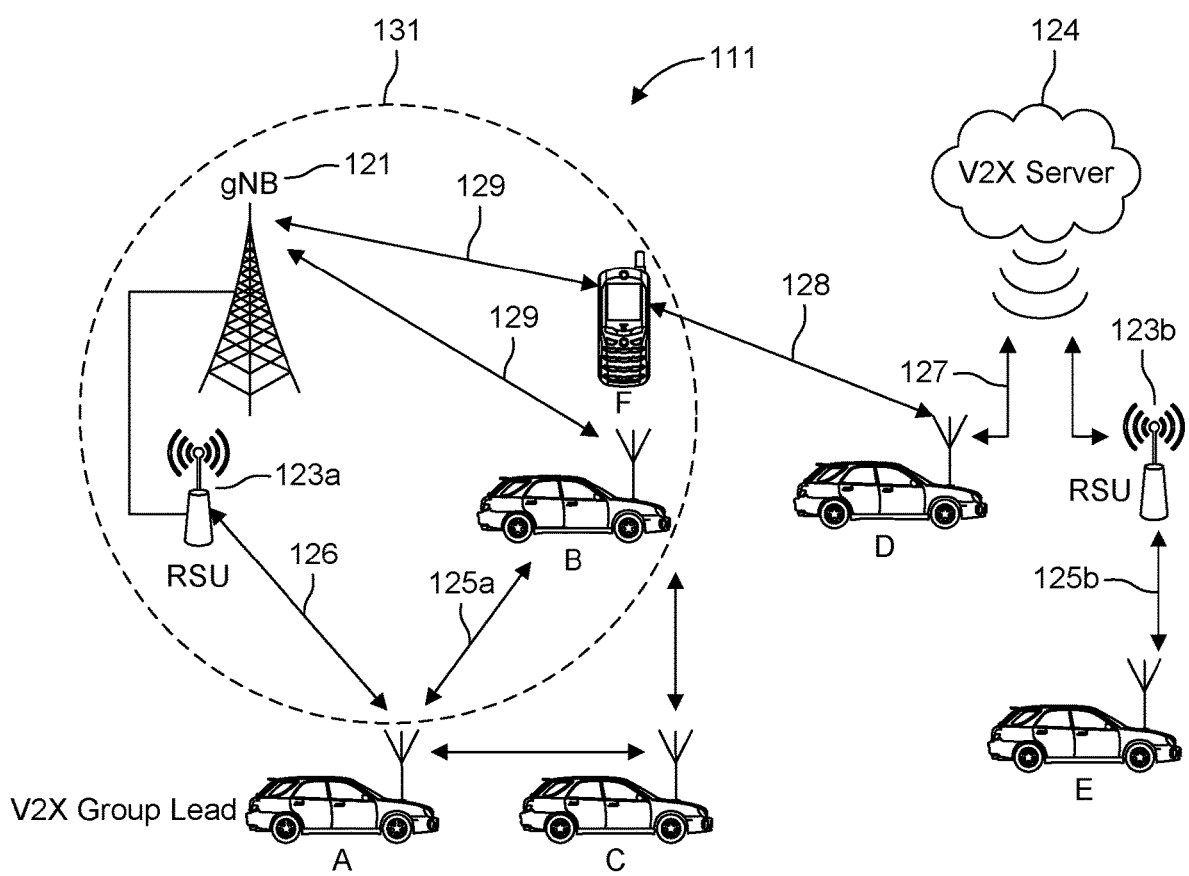

FIG. 19E illustrates an example communications system 111 in which the systems, methods, apparatuses that implement paging a remote UE, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 19E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 19E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 19F:
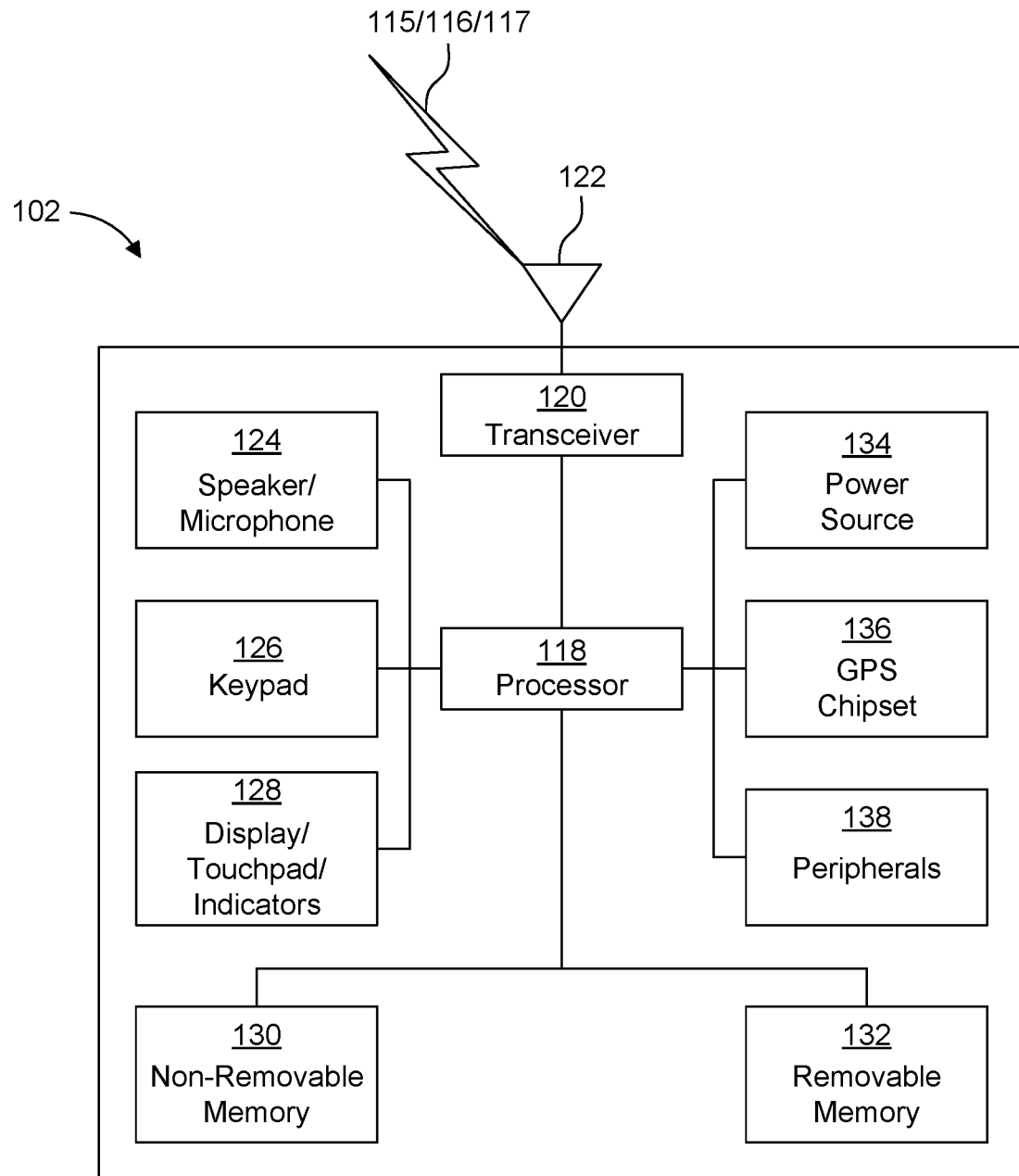

FIG. 19F is a block diagram of an example apparatus or device WTRU 102 that may be configured for wireless communications and operations in accordance with the systems, methods, and apparatuses that implement paging a remote UE, described herein, such as a WTRU 102 of FIG. 19A, FIG. 19B, FIG. 19C, FIG. 19D, or FIG. 19E, or FIG. 5-FIG. 16 (e.g., UEs). As shown in FIG. 19F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 19F and may be an exemplary implementation that performs the disclosed systems and methods for paging a remote UE described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 19F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 19A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 19F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether some of the examples described herein are successful or unsuccessful, or otherwise indicate a status of paging a remote UE and associated components. The control lighting patterns, images, or colors on the display or indicators 128 may be reflective of the status of any of the method flows or components in the FIG.'s illustrated or discussed herein (e.g., FIG. 6-FIG. 16, etc.). Disclosed herein are messages and procedures of paging a remote UE. The messages and procedures may be extended to provide interface/API for users to request resources via an input source (e.g., speaker/microphone 124, keypad 126, or display/touchpad/indicators 128) and request, configure, or query paging a remote UE related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 19G:
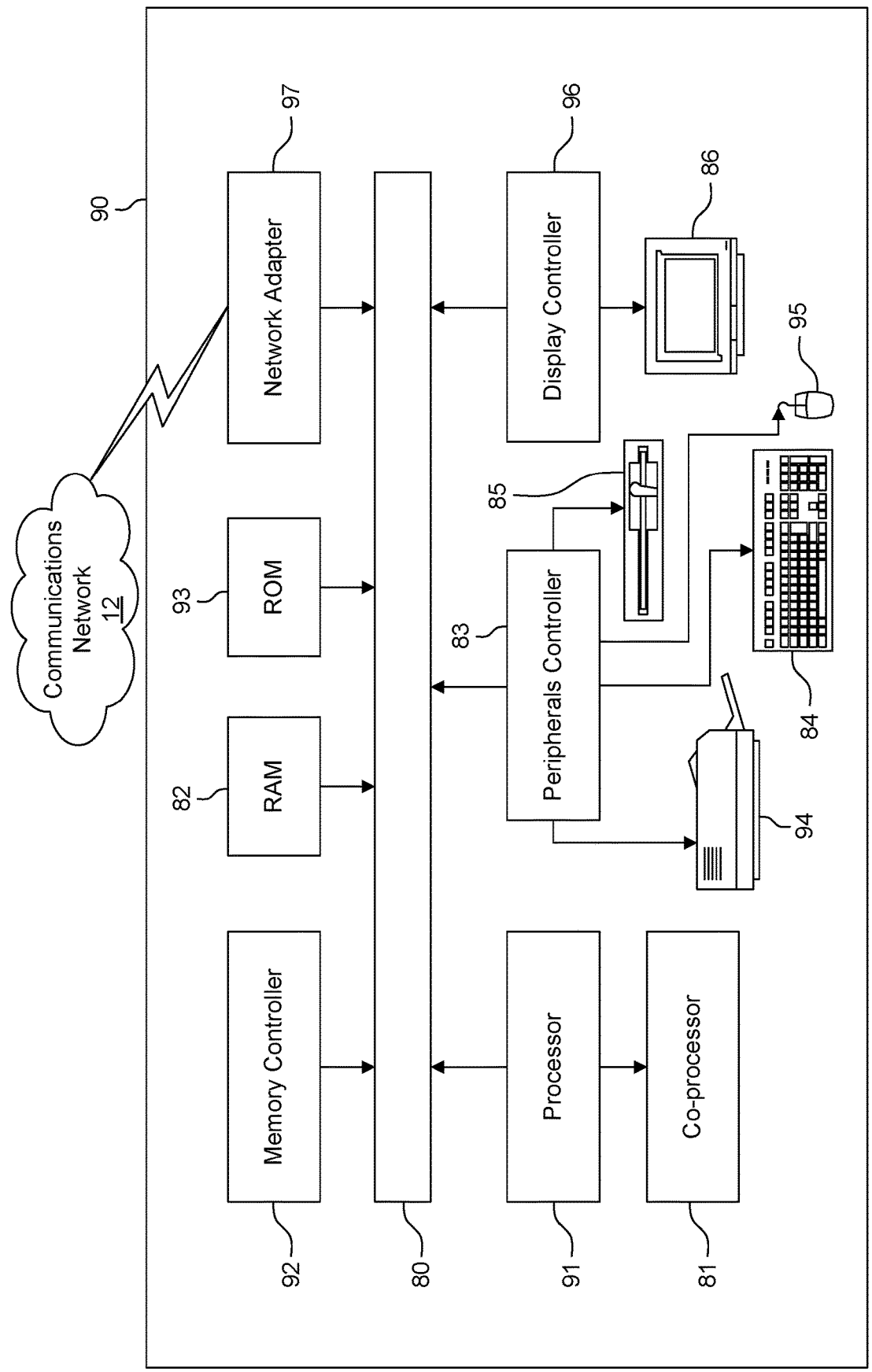

FIG. 19G is a block diagram of an exemplary computing system 90 in which one or more apparatuses of the communications networks illustrated in FIG. 19A, FIG. 19C, FIG. 19D and FIG. 19E as well as for paging a remote UE, such as the systems and methods illustrated in FIG. 7 through FIG. 16 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for paging a remote UE.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 19A, FIG. 19B, FIG. 19C, FIG. 19D, or FIG. 19E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—paging a remote UE—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein, such as associated with FIG. 7-FIG. 17).

Methods, systems, and apparatuses, among other things, as described herein may provide for means for paging a remote UE. A method, system, computer readable storage medium, or apparatus provides for enabling or disabling the relay function for relaying paging message; determining whether to serve as a paging relay for a second device; monitoring a paging occasion based on information of a second device; receiving a paging message from a third device; forwarding the paging message towards the second device; maintaining the status to serve as paging relay for the second device. The information may be a parameter to calculate the paging occasion and DRX of the remote UE. The information may be from Table 2, 3, 4 or 5. The second device is a remote UE. The third device is a base Station The first device may enable or disable its relay function itself based on its indication of status. The first device may enable or disable its relay function based on number of relay UE proximate to the first device (e.g., in its vicinity). The first device may enable or disable its relay function based on configuration received from the second device. The second device may send an explicit dedicate message to enable or disable the relay function. The second device may send criteria for a UE to enable or disable the relay function. The first device may broadcast relay context information if relay function is enabled. The first device may receive a request message to serve as a paging relay for a second device. The first device may determine whether to serve as a paging relay for a second device. The first device may send a request message indicating the ability to serve as a paging relay to a third device. The first device may receive a configuration to serve as a paging relay for a second device. The configuration may include the paging occasion or the parameter to calculate paging occasion for the second device. The configuration may include the next device to forward the paging message toward the second device. The first device may be triggered to select a fourth device and establish a new paging path between the second and the third device. The first device may be trigged by the change of status of the SL and the status of neighbor relay UEs. The fourth device may receive configuration information (from the first device or another device) about the paging occasion or the parameter to calculate paging occasion for the second device. The configuration information may include information of Table 4, such as Paging Occasion configuration information. The first device may receive a periodical update message from the second device and forward the update message towards the third device after piggy backing its own update message. The enabling of the relay may be based on a configuration received from the third device. The update message may be a registration update message or a RAN Notification area update message. Methods, systems, and apparatuses, among other things, as described herein may provide for receiving criteria from a third device for enabling or disabling the relay function. Methods, systems, and apparatuses, among other things, as described herein may provide for receiving an explicit dedicate message from the third device to enable or disable the relay function. Methods, systems, and apparatuses, among other things, as described herein may provide for receiving a configuration from the third device to serve as a paging relay for a second device Methods, systems, and apparatuses, among other things, as described herein may provide for enabling a relay function for relaying a paging message; receiving a request to serve as a paging relay for a second device; in response to the request, determining to serve as a paging relay for a second device; monitoring a paging occasion based on information of the second device; receiving a paging message from a third device; or forwarding the paging message towards the second device. All combinations in this paragraph (including the removal or addition of steps) are contemplated in a manner that is consistent with the other portions of the detailed description.

What is claimed is:

1. A first User Equipment (UE) acting as a network relay comprising:
   a processor; and
   a memory coupled with the processor, the memory storing executable instructions that when executed by the processor cause the processor to effectuate operations comprising:
   receiving, from a network, a paging path discovery message to configure the first UE's adaptation layer to forward paging from the network to a remote user equipment (UE);
   receiving a paging path configuration message to configure the first UE's adaptation layer to forward paging from the network to the remote UE, via a second UE acting as a UE-to-UE relay;
   enabling a relay function for relaying a paging message, wherein the enabling of the relay function is based on the paging path discovery message and the paging path configuration message;
   receiving a request to serve as a paging relay for the remote UE;
   in response to the request, determining to serve as a paging relay for the remote UE;
   receiving a paging message from the network, the paging message comprising a paging propagation path identifier (ID); and
   forwarding the paging message towards the remote UE via the second UE based on the paging propagation path ID.

2. The first UE of claim 1, wherein the operations further comprise receiving an explicit dedicated message from the network to enable or disable the relay function.

3. The first UE of claim 1, wherein the operations further comprise receiving criteria from the network for enabling or disabling the relay function.

4. The first UE of claim 1, wherein the operations further comprise broadcasting relay context information when the relay function is enabled.

5. The first UE of claim 1, wherein the operations further comprise sending a message indicating the ability to serve as a paging relay to the network.

6. The first UE of claim 1, wherein the operations further comprise selecting a fourth device to establish a new paging path between the remote UE and the network.

7. The first UE of claim 6, wherein the selecting of the fourth device is trigged by the change of status of a sidelink and status of neighbor relay UEs.

8. The first UE of claim 6, wherein the operations further comprise sending the fourth device configuration information about a paging occasion or a parameter to calculate a paging occasion for the second device.

9. The first UE of claim 1, wherein the operations further comprise:
   receiving a periodic update message from the remote UE; and
   forwarding the update message towards the network after inserting update information associated with the first UE.

10. The first UE of claim 9, wherein the update message is a registration update message or a radio access network (RAN) Notification area update message.

* * * * *